US008179343B2

(12) United States Patent
Sumioka et al.

(10) Patent No.: US 8,179,343 B2
(45) Date of Patent: May 15, 2012

(54) DISPLAY APPARATUS AND DRIVING METHOD OF DISPLAY APPARATUS

(75) Inventors: Jun Sumioka, Yokohama (JP); Kaoru Okamoto, Tokyo (JP); Tadahiko Hirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 856 days.

(21) Appl. No.: 12/139,182

(22) Filed: Jun. 13, 2008

(65) Prior Publication Data

US 2009/0002356 A1 Jan. 1, 2009

(30) Foreign Application Priority Data

Jun. 29, 2007 (JP) ................................ 2007-172458

(51) Int. Cl.
*G09G 3/30* (2006.01)
*G09G 5/00* (2006.01)
*G06F 3/038* (2006.01)

(52) U.S. Cl. ............................ 345/76; 345/77; 345/211

(58) Field of Classification Search ............. 345/76–83, 345/92, 204, 210, 212, 214, 690, 60; 315/169, 315/169.3; 257/291; 348/207.11
See application file for complete search history.

(56) References Cited

U.S. PATENT DOCUMENTS

| | | | | |
|---|---|---|---|---|
| 6,310,589 | B1 | 10/2001 | Nishigaki et al. | 345/76 |
| 7,113,156 | B2 * | 9/2006 | Hashimoto | 345/77 |
| 7,317,434 | B2 * | 1/2008 | Lan et al. | 345/76 |
| 7,423,617 | B2 * | 9/2008 | Giraldo et al. | 345/82 |
| 7,760,168 | B2 * | 7/2010 | Ogura | 345/77 |
| 7,791,569 | B2 * | 9/2010 | Hirai | 345/76 |
| 7,868,857 | B2 * | 1/2011 | Nathan et al. | 345/82 |
| 2006/0125740 | A1 * | 6/2006 | Shirasaki et al. | 345/77 |
| 2006/0139261 | A1 * | 6/2006 | Choi et al. | 345/76 |
| 2006/0187153 | A1 * | 8/2006 | Nathan et al. | 345/76 |
| 2006/0227083 | A1 * | 10/2006 | Miyazawa | 345/76 |
| 2006/0232678 | A1 * | 10/2006 | Choi et al. | 348/207.11 |
| 2006/0290622 | A1 * | 12/2006 | Nakatogawa | 345/82 |
| 2007/0080908 | A1 | 4/2007 | Nathan et al. | 345/77 |
| 2009/0051628 | A1 * | 2/2009 | Kwon | 345/77 |
| 2010/0073265 | A1 * | 3/2010 | Hirai et al. | 345/55 |

* cited by examiner

*Primary Examiner* — Quan-Zhen Wang
*Assistant Examiner* — Lin Li
(74) *Attorney, Agent, or Firm* — Fitzpatrick, Cella, Harper & Scinto

(57) ABSTRACT

A display apparatus includes a scanning line, a signal line, and a pixel circuit. The pixel circuit is selected according to a signal applied to the scanning line, and a signal is input to the selected pixel circuit from the signal line. The pixel circuit include a holding capacitor, a first switch which opens and closes connection between one terminal of the light emitting element and the signal line in accordance with a signal applied to the scanning line, and a second switch which opens and closes connection between one terminal of the holding capacitor and the signal line in accordance with a signal applied to the scanning line. First and a second voltage supplies are switchably connected to the signal line, and during a period when the pixel circuit is selected, the first voltage supply is connected to the signal line and the first switch is closed so that a voltage of the first voltage supply is applied to a terminal of the light emitting element, and the second voltage supply is connected to the signal line and the second switch is closed and the first switch is opened, so that a voltage of the second voltage supply is applied to one terminal of the holding capacitor. A voltage of the first voltage supply is determined based on a terminal-to-terminal voltage of the light emitting element when a voltage of the second voltage supply is applied to the holding capacitor and current flows in the light emitting element.

9 Claims, 17 Drawing Sheets

DISPLAY APPARATUS AND DRIVING METHOD OF DISPLAY APPARATUS

BACKGROUND OF THE INVENTION

1. Field of the Invention

The present invention relates to a display apparatus including a plurality of mutually crossing signal lines and scanning lines, a pixel circuit provided with holding capacitors and switching elements, and light emitting elements, and to a driving method thereof. In particular, the present invention relates to a display apparatus of a current drive type light emitting element including coupling capacitance such as an organic electro-luminescence (EL) element, and a driving method thereof.

2. Description of the Related Art

In the recent years, display apparatuses are being developed energetically. Among such display apparatuses, a display apparatus with an organic EL element for a light emitting element is getting attention. An organic EL element is a self light emitting element that uses the principle in which recombination energy between holes and electrons injected respectively from an anode and a cathode by applying a voltage results in light emission from a light emitting layer made of organic material.

FIG. 24 illustrates a sectional view of a basic organic EL element. An organic EL element 201 has an anode 2502, a light emitting layer 2503 and a cathode 2504, which are stacked on a substrate 2501. Both ends of a drive circuit not illustrated in the drawing are respectively connected with the anode 2502 and the cathode 2504 of the organic EL element 201, so that a voltage generated by the drive circuit is applied to the anode and the cathode. The voltage is applied to the organic EL element 201 and thereby current flows so that light emission takes place at desired brightness.

So far, various methods of driving a display apparatus with an organic EL element have been proposed. However, as resolution of a display and drive speed are enhanced, a demand for increasing the speed of a program of (writing) image data to be input to each pixel is increasing. The driving method is generally categorized into a voltage programming method and a current programming method and, in particular, the slow program speed at the time of low gradation is a problem in the current programming method. On the other hand, it is difficult to compensate variation of current-voltage property of an organic EL element and variation of mobility of a switching element in the voltage programming method.

At first, a display apparatus of the voltage programming method will be briefly described. FIG. 25 is an example of a display apparatus based on the voltage programming method with pixels 107 respectively having a plurality of organic EL elements 201, holding capacitors 301, selection transistors 302 and drive transistors 303 being arranged.

In FIG. 25, a great number of pixels 107 are arranged in a matrix form to configure a display region. Here, in order to simplify the drawing, an example of pixel arrangement for two rows and two columns covering the i-th row to the i+1-th row and the i-th column to the i+1-th column is illustrated. Scanning lines 202 are wired respectively for the pixel circuits 101 in the display region. The scanning signals X(i) to X(i+1) are input to the scanning lines 202 in sequence. Thereby, each pixel 107 is selected for each row. In addition, the signal lines 103, which supplies each pixel with the image data, that is, brightness data Y(i) to Y(i+1), are wired.

In the following description, the pixel circuit 101 will be described by exemplifying the pixel circuit of the pixel (i, i) for the i-th row and i-th column. Here, as for the pixel circuit of the other pixels will be provided with the completely same circuit configuration. In addition, the organic EL element 201 is used as the display element and a thin film transistor is used as the switching element in the pixel circuit.

As illustrated in FIG. 25, the pixel circuit 101 includes a selection transistor 302 for selecting a pixel 107, a holding capacitor 301 for holding a data voltage and a drive transistor 303 for driving an organic EL element 201. The holding capacitor 301 is a capacitor in which an image data for displaying an image is programmed as a voltage and the voltage is held until the next image data is programmed by the signal of a scanning line. The brightness data is given in a voltage form from the signal line 103. A current corresponding with the data voltage flows in the organic EL element 201.

As the specific relation of connection, the anode 2502 of the organic EL element 201 is connected with the power supply voltage 305 (hereinafter to be referred to as Vdd). The drive transistor 303 is brought into connection between the cathode 2504 of the organic EL element 201 and a common ground line 304. The holding capacitor 301 is brought into connection between the gate of the drive transistor 303 and the common ground line 304. The selective transistor 302 is brought into connection between the signal line 103 and the gate of the drive transistor 303. The gate is connected with the scanning line 202.

In the display apparatus by the above described voltage programming method, various circuit configurations and driving methods are proposed for compensating the property variation of the organic EL element, the selective transistor and the drive transistor.

In the case of the voltage programming method, the threshold voltage variation of the organic EL element, the selection transistor and the drive transistor can be compensated by adding transistors and holding capacitor for compensation.

However, it is difficult to compensate the current-voltage property variation of the organic EL element and the mobility variation of the transistor. In order to compensate the variations, a method of driving the display apparatus by the current programming method including a constant current source outside the pixel circuit is proposed.

Since the voltage of the holding capacitor is determined by causing a data current for obtaining desired brightness to flow in one of the transistor and the organic EL element in the pixel circuit, the current programming method will be able to compensate the property variation of the organic EL elements and the transistors more accurately.

FIG. 3 is a drawing illustrating a pixel of a display apparatus of a current programming method proposed by Nathan et al in U.S. Patent Application Publication No. 2007/080908 specification.

This pixel circuit comprises a switching circuit 401 including two selective transistors T1 and T2 and a current mirror circuit 402 including a reference transistor T3 and a drive transistor T4. The control terminals (gates) of the reference transistor T3 and the drive transistor T4 are both connected with a terminal of the holding capacitor. One main electrode (source) of each of the transistors T3 and T4 is connected with the organic EL element 201.

Here, the transistors T1 to T4 are n-type thin film transistors.

A first technological advantage of the pixel circuit herein is the possibility of splitting loads born by the selective transistors T1 and T2 and the drive transistor T4 since this pixel circuit is a current mirror circuit. That is, since the current can flow in the organic EL element 201 only through the drive transistor T4 from the power supply voltage Vdd 305, the electricity consumption can be made small. A second technological advantage is the possibility of compensating the property variation of the organic EL element 201 since current programming can be carried out while a data current 403 is flowing in the organic EL element 201.

A current programming method of the pixel circuit illustrated in FIG. 3 will be described briefly. At first, the selection transistors T1 and T2 are selected with the signal of the scanning line 202 to be activated. In synchronization, a constant current source not illustrated in the drawing supplies the signal line 103 with a predetermined data current 403 so that the electric charge is charged in the holding capacitor 301 through the selective transistor T2. When the holding capacitor 301 is charged to reach a predetermined voltage, the reference transistor T3 and the drive transistor T4 are activated so that a current starts to flow in the organic EL element 201. Here, the organic EL element 201 also has a coupling capacitor. Therefore, the coupling capacitor here is charged so that the predetermined data current 403 does not flow in the organic EL element 201 until a terminal reaches a predetermined voltage.

Subsequently, even if the current programming operation is finished so that the selective transistors T1 and T2 and the reference transistor T3 are inactivated with the signal of the scanning line 202, the drive transistor T4 maintains the ON state with the voltage of the holding capacitor 301. Accordingly, the current corresponding with predetermined data current 403 can continue to flow in the organic EL element 201 through the drive transistor T4 from the power supply voltage Vdd 305 until the next cycle current program.

However, the pixel circuit illustrated in FIG. 3 gives rise to a problem as follows.

A reason here is that, at the time of low gradation, charging to the holding capacitor and the coupling capacitor of the organic EL element cannot catch up with the programming time, resulting in charging insufficiency. In the above described current program, at the time of low gradation, microcurrent has to charge the holding capacitor and the coupling capacitance of the organic EL element. Consequently it takes time for programming. Accordingly, at the time of low gradation, the holding capacitor and the coupling capacitor of the organic EL element gets short of charging. Therefore, accurate gradation display cannot be obtained but black floating appears in the panel display screen, giving rise to a problem.

In order to solve the problem to give rise to shortage in charging at the time of low gradation in a current programming method, a technique called precharge is proposed as prior art.

Precharge is the technique of applying a predetermined voltage to a signal line before starting the current programming operation and, thereby, charging the capacitor component in advance. For example, U.S. Pat. No. 6,310,589 by Nishigaki et al proposes a drive circuit of an organic EL element including a charging circuit for precharge as illustrated in FIGS. 26 to 28.

FIG. 26 illustrates a pixel 107 of a passive matrix organic EL element 201 illustrated in FIG. 27, a constant current source 501 connected to the signal line 103 and a charging circuit 502 for precharge.

Here, the passive matrix drive circuit will be described briefly with FIG. 27. As illustrated in FIG. 27, the passive matrix drive circuit is configured by a plurality of organic EL elements 201, a plurality of signal lines 103 and a plurality of scanning lines 202. In order for a pixel 107 to emit light at predetermined brightness, a voltage can be applied between the mutually crossing signal line 103 and scanning line 202 so that a predetermined current flows in the organic EL element 201.

Getting back to FIG. 26, the description will go on. Each signal line 103 is provided with the constant current source 501 and the charging circuit 502 in FIG. 26 in the panel peripheral circuit outside the pixel circuit. The operation of the drive circuit in FIG. 26 will be described. At first, in synchronization with the output of the constant current source 501, the output of the pulse generator 503 will get High to apply a precharging voltage V 504 from the charging circuit 502 to the signal line 103. The precharge voltage can charge the coupling capacitor of the organic EL element 201 in short time and can shorten the time up to the start of light emission of the organic EL element 201.

FIG. 28 illustrates a timing chart of the drive circuit in FIG. 26. FIG. 26 illustrates a passive matrix drive circuit. Therefore, when the signal of the scanning line 202 is Low, a voltage is applied to the organic EL element 201. During the initial precharging period, the output of the pulse generator 503 gets High to activate the switch SW of the charging circuit 502. Thereby, the drive waveform of the signal line 103 rapidly rises to reach the precharging voltage V 504 to charge the organic EL element 201. Thereafter, during a constant current drive period, the output of the pulse generator 503 gets Low to supply the signal line 103 with the data current only from the constant current source 501.

However, the present inventors have found out that the time for the organic EL element to start light emission is not so shortened as the passive matrix is shortened even if a method of this precharge is applied to the drive circuit of the active matrix in FIG. 3, giving rise to a problem.

The pixel 107 in FIGS. 26 and 27 is replaced with a pixel comprising the switching circuit 401 illustrated in FIG. 3, the current mirror circuit 402 and the organic EL element 201. The signal of the scanning line is changed either from High to Low or from Low to High. Then, precharge can be carried out with a timing chart in FIG. 28.

However, in the case of the active matrix, the precharge voltage is applied not to the coupling capacitor of the organic EL element directly but to the holding capacitor 301. Therefore, it takes time to charge the organic EL element with the terminal-to-terminal voltage. Consequently, the time until starting light emission is not so shortened as the passive matrix is.

Unless the terminal-to-terminal voltage of the organic EL element is charged to a certain extent before the current signal flows in, charging takes time. The variation of the terminal-to-terminal voltage of the organic EL element for that period changes the source-to-drain voltage of the reference transistor T3 to enable no accurate data current to flow. Consequently, the time for the current programming will get longer. Thus, charging the coupling capacitor of the organic EL element is slow in the pixel circuit of the organic EL element of the active matrix and current programming takes time.

The gate voltages of the reference transistor T3 and the drive transistor T4 that are connected to the organic EL element are low at the time of low gradation. At that time, the current supplied to the organic EL element from the reference transistor T3 and the drive transistor T4 is limited. Therefore, charging will take longer at the time of low gradation.

SUMMARY OF THE INVENTION

It is an aspect of the invention to provide a display apparatus capable of charging coupling capacitor and holding capacitor of a light emitting element in short time and a method of driving the display apparatus.

According to an aspect of the present invention, a display apparatus of the invention includes a scanning line; a signal line; and a pixel circuit arranged in a site where the scanning line crosses the signal line, which controls a light emitting element and current to be supplied to the light emitting element, wherein the pixel circuit is selected according to a signal applied to the scanning line and a signal is input to the selected pixel circuit from the signal line, and the pixel circuit includes: holding capacitor; a first switch which opens and closes connection between one terminal of the light emitting element and the signal line in accordance with a signal applied to the scanning line; and a second switch which opens and closes connection between one terminal of the holding capacitor and the signal line in accordance with a signal applied to the scanning line, wherein a first and a second voltage supplies are switchably connected to the signal line, and during a period when the pixel circuit is selected, the first voltage supply is connected to the signal line and the first switch is closed so that a voltage of the first voltage supply is applied to a terminal of the light emitting element, and the second voltage supply is connected to the signal line and the second switch is closed so that a voltage of the second voltage supply is applied to one terminal of the holding capacitor.

According to another aspect of the present invention, a driving method of a display apparatus including: a scanning line; a signal line; and a pixel circuit arranged in a site where the scanning line crosses the signal line, which controls a light emitting element and current to be supplied to the light emitting element, wherein the pixel circuit includes: holding capacitor; a first switch which opens and closes connection between one terminal of the light emitting element and the signal line with a signal applied to the scanning line; a second switch which opens and closes connection between one terminal of the holding capacitor and the signal line in accordance with a signal applied to the scanning line, and a first and a second voltage supplies are switchably connected to the signal line, includes a step of applying a signal to the scanning line to close the first switch and connecting the first voltage supply to the signal line to apply a voltage of the first voltage supply to one terminal of the light emitting element and a step of applying a signal to the scanning line to close the second switch and connecting the second voltage supply to the signal line to apply a voltage of the second voltage supply to one terminal of the holding capacitor.

The present invention will enable to charge coupling capacitor and holding capacitor of a light emitting element in short time even at the time of low gradation. Consequently, the programming speed can be accelerated.

The present invention is applied to the active matrix display and a method of driving the display and in particular can be utilized for a display apparatus, which emits light when a current flows in such a light emitting element, as an organic EL element and an inorganic EL element. For example, the present invention can be utilized for a display apparatus selected from the group consisting of digital cameras, portable telephones, PDAs and television sets.

Further features of the present invention will become apparent from the following description of exemplary embodiments with reference to the attached drawings.

DESCRIPTION OF THE EMBODIMENTS

Figure 1:
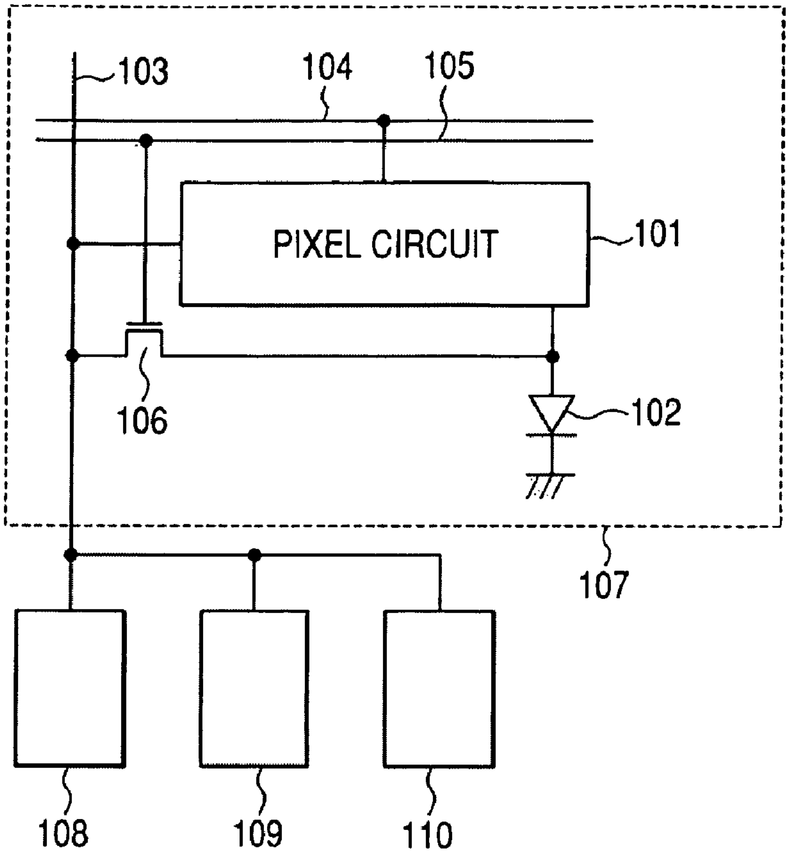
FIG. 1 illustrates a configuration of a display apparatus of the present invention.

FIG. 1 illustrates a configuration of a display apparatus related to one of exemplary embodiments of the present invention. Here, in FIG. 1, only one pixel is illustrated, while actually, a plurality of pixels are arranged to shape a matrix.

A pixel 107 of a display apparatus of the present exemplary embodiment includes a pixel circuit 101 including a holding capacitor not illustrated in the drawing and a switching element not illustrated in the drawing, a light emitting element 102 driven by the pixel circuit 101, and a switching element 106.

The pixel circuit 101 and the light emitting element 102 are provided at a site where a plurality of mutually crossing signal lines 103 and the first and second scanning lines 104 and 105 are mutually crossing. One pixel is provided with two scanning lines. An organic electro-luminescence (EL) element is used for the light emitting element 102, for example, but will not be limited to the organic electro-luminescence (EL) element. The pixel circuit 101 is selected when a selective pulse is applied to the scanning line. An image signal is input from the signal line and the pixel circuit holds the image signal, which is called programming. The pixel circuit provides the light emitting element with drive current corresponding to a signal having undergone programming.

The pixel circuit includes a switching element 106 being a first switch.

The switching element 106 is a transistor. A control terminal is connected to one of the two scanning lines (second scanning line 105). Two main electrodes are connected to the signal lines 103 and the light emitting element 102 respectively. The switching element 106, which is controlled by a signal applied to the second scanning line 105 to open and close, closes when a selective signal is applied to the second scanning line to bring the signal lines 103 and the light emitting element 102 into electrical connection.

In the case where the switching element is a thin film transistor (TFT), a control terminal is the gate. Here, in the present application, in the case where the transistor is a field-effect transistor, the control terminal is the gate. The main electrode terminal corresponds to the source or the drain. Moreover, the signal line 103 is brought into connection to a current source 108 serving as a current supply unit for supplying a predetermined current signal in accordance with an input signal, a first voltage supply 109 serving as a voltage supply unit and a second voltage supply 110.

Figure 2:
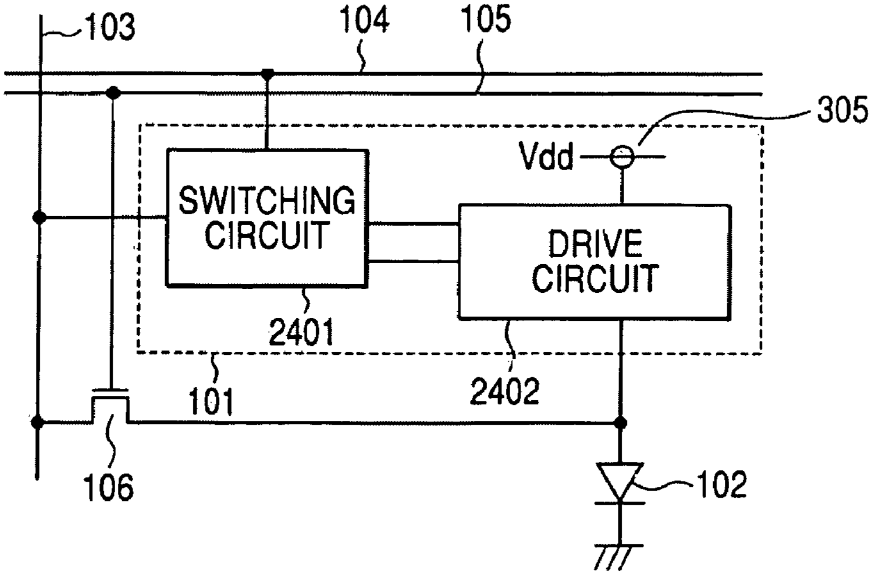
FIG. 2 illustrates a configuration of a pixel circuit of a display apparatus of the present invention.

FIG. 2 illustrates a configuration of the pixel circuit 101 illustrated in FIG. 1. The pixel circuit 101 includes a switching circuit 2401 being a second switch and a drive circuit 2402 driving a light emitting element. The switching circuit 2401 includes at least one of switching elements and is connected to one (first scanning line 104) of the two scanning lines, to the signal line 103 and to a drive circuit 2402. The switching circuit 2401 is controlled by a signal applied to the first scanning line 104 to open and close and closes when a selective signal is applied to the scanning line to bring the signal line 103 and the drive circuit 2402 into electrical connection.

The switching circuit 2401 controls ON/OFF of the programming operation. The drive circuit 2402 includes at least one of holding capacitors and at least one of switching elements and is connected to the switching circuit 2401, a power supply voltage Vdd, the light emitting element 102 and the switching element 106. The drive circuit 2402 writes data voltage on the holding capacitor during a programming period to cause constant current to continue flowing in the light emitting element 102 during the holding period after the programming period.

Figure 7:
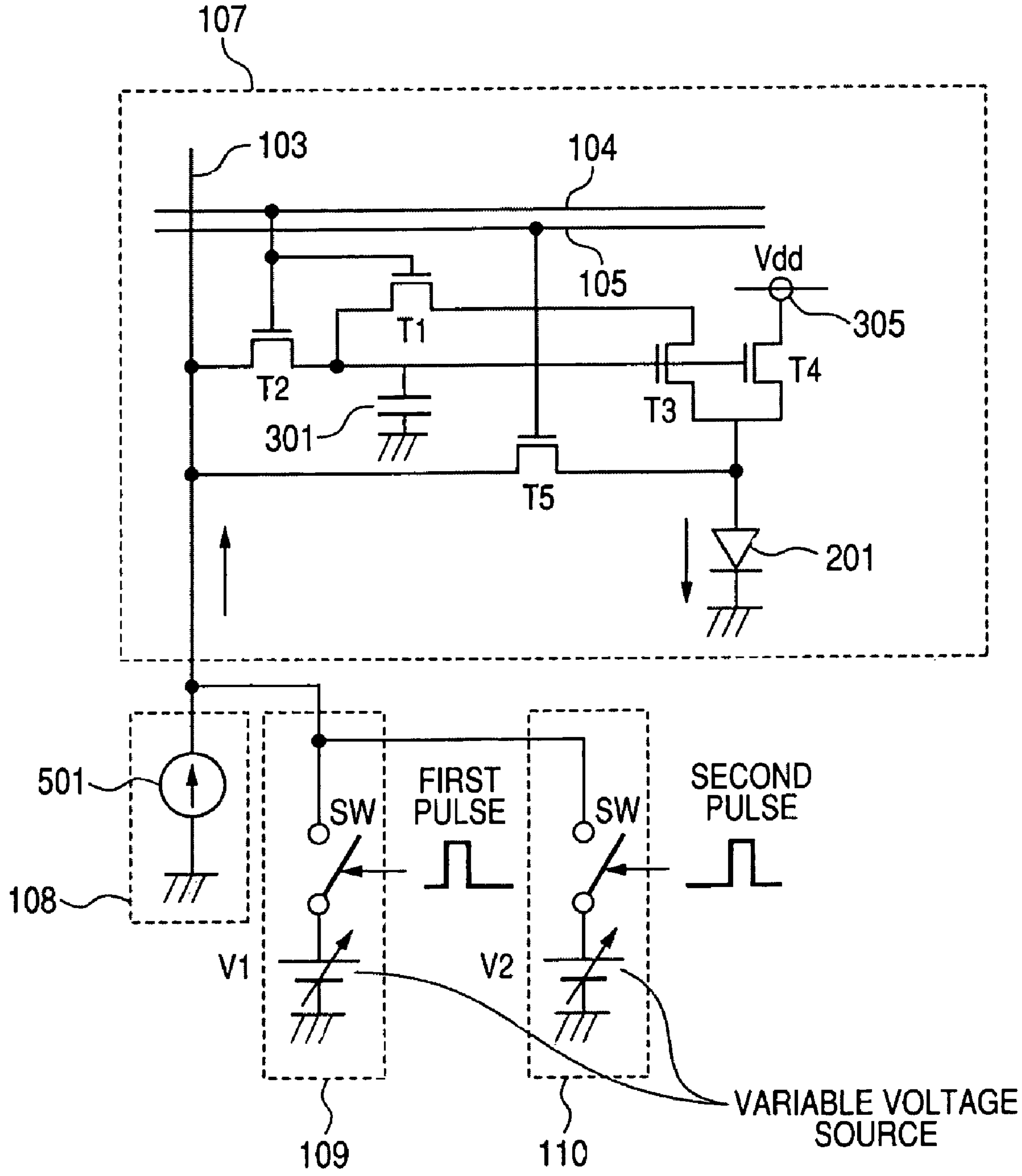
FIG. 7 illustrates a pixel circuit of embodiments 1 and 2 of the present invention.

As the pixel circuit 101 used for the display apparatus of the present invention, a pixel circuit including a current mirror circuit as illustrated in FIG. 7 to be described later can be used. Otherwise, as illustrated in FIG. 4, a pixel circuit of a voltage programming method including transistors T1 and T2 and a holding capacitor may be used.

Exemplary Embodiment with Voltage Programming Method

A circuit in FIG. 4 will be described below as an example.

Figure 4:
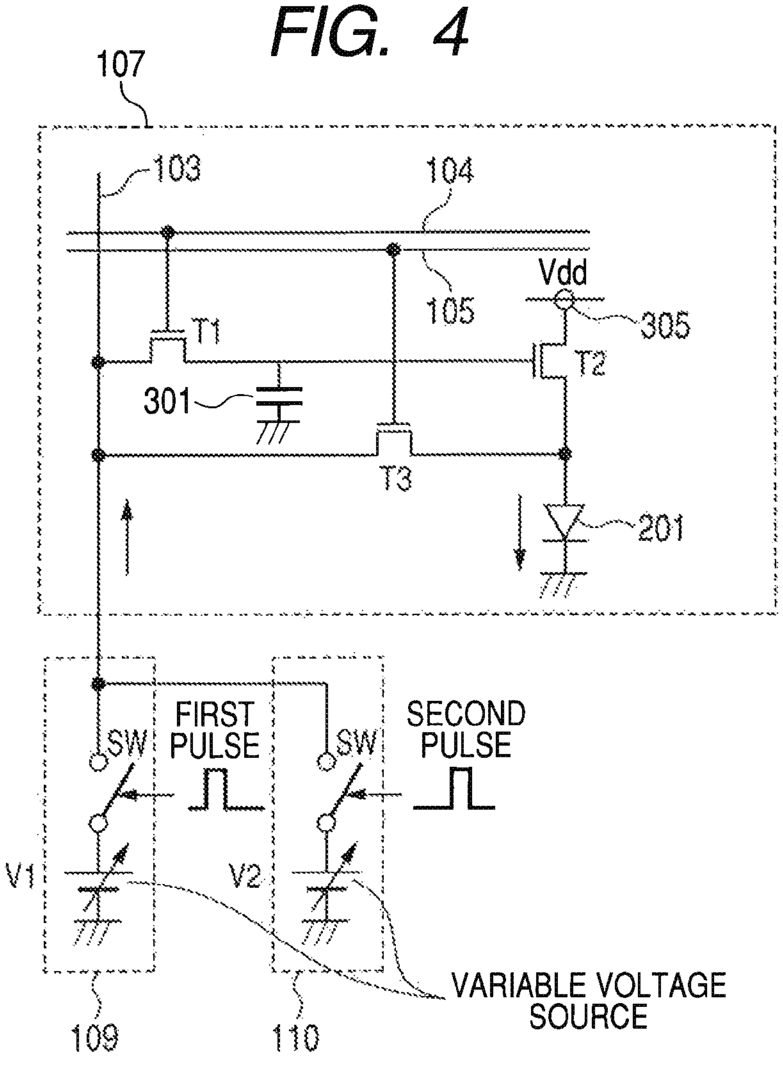
FIG. 4 illustrates a pixel circuit of a voltage programming method of a display apparatus of the present invention.

FIG. 4 illustrates a specific circuit of the display apparatus in FIG. 1.

The first switch is configured by the transistor T3 to open and close with the signal of the first scanning line 104. The second switch is configured by the transistor T1 to open and close with the signal of the second scanning line 105. The pixel circuit is configured by the holding capacitor 301 and the transistor T2 driving the organic EL element 201.

The first voltage supply 109 and the second voltage supply 110 are respectively and switchably connected to the signal line with a switch. Any one of the switches closes to connect the first or second voltage supply to the signal line 103.

The first voltage supply 109 and the second voltage supply 110 are respectively set so as to change the output variably. The output voltage of the second voltage supply is a voltage signal programmed in a pixel and changes in accordance with an image signal. The output voltages of the first and second voltage supplies are determined as to be described as follows.

The voltage which the first voltage supply 109 outputs charges coupling capacitor of the light emitting element 102. The voltages will be determined as follows.

Figure 5:
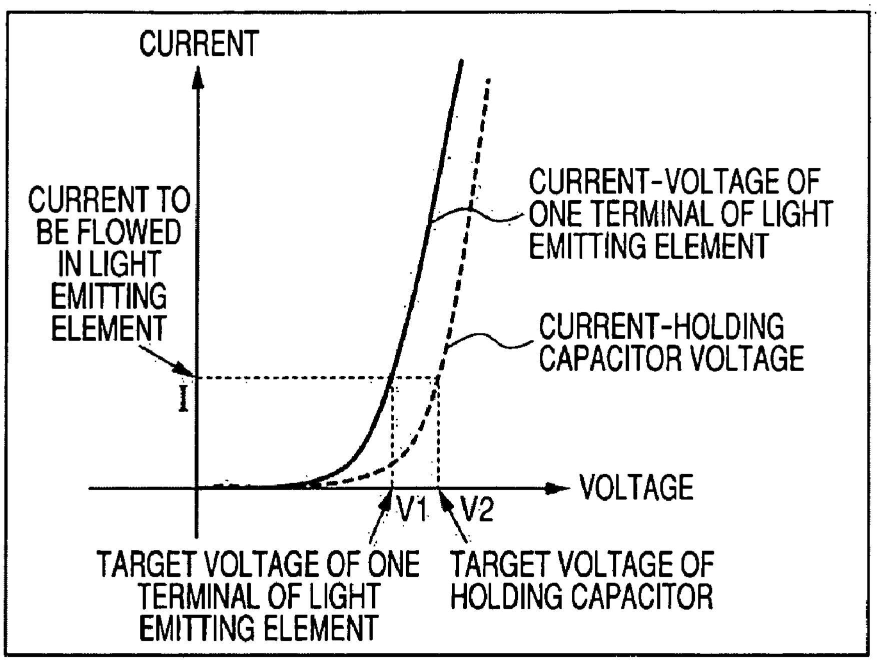
FIG. 5 illustrates the relation among the terminal-to-terminal voltage of a light emitting element, the holding capacitor voltage and the current of the light emitting element.

In FIG. 5, the solid line represents the relation between the terminal-to-terminal voltage (axis of abscissae) of the light emitting element and the current (axis of ordinates) flowing through the light emitting element.

If an image signal is given so that current flowing in the light emitting element is determined as the current I in the axis of ordinates, the axis-of-abscissae coordinate V1 at the intersecting point where the horizontal line passing the current I crosses the solid line indicating current-voltage property is the light emitting element-to-light emitting element voltage, which is a target voltage of a terminal of the light emitting element 102. An output voltage of the first voltage supply 109 is set to the target voltage V1.

The voltage which the second voltage supply 110 outputs charges the holding capacitor 301. A method of determining the voltage will be described as follows.

The dashed line in FIG. 5 represents the relation between the terminal-to-terminal voltage (axis of abscissae) of the holding capacitor 301 and the current (axis of ordinates) flowing from the transistor (T2 in FIG. 4) of the pixel circuit to the light emitting element. If current flowing in the light emitting element is given as the current I of the axis of ordinates, the axis-of-abscissae coordinate V2 at the intersecting point where the horizontal line passing the current I crosses the dashed line indicating current-voltage property is the voltage of the holding capacitor, which is a target voltage of the holding capacitor 301. An output voltage of the second voltage supply 110 is set to the target voltage V2.

Setting the output voltages V1 and V2 of the first and second voltage supplies as described above, a voltage V1 is applied to the light emitting element 201 when the first voltage supply 109 is connected to the signal line 103 and a voltage of the output voltage V1 is charged in the terminal-to-terminal capacitor (coupling capacitance) of the light emitting element. Thereafter, the second voltage supply 110 is connected to the signal line 103. The output voltage V2 is applied to the holding capacitor. The output voltage V2 is programmed in the holding capacitor. When charging of the voltage V2 to the holding capacitor is finalized, the first and second switches are both put off so that the signal line 103 and the pixel circuit are disconnected. However, since the voltage V2 of the holding capacitor is maintained, current flows in the light emitting element 201 through the drive transistor T2 from the power supply 305 so that light emission continues.

In the circuit in FIG. 4, the output voltage V2 is a signal voltage determining the drive current of the light emitting element and is a voltage being variable in a constant range according to brightness.

On the other hand, the output voltage V1 is set so that the current determined by the output voltage V2 gets equal to the terminal-to-terminal voltage of the light emitting element as much as possible at the time when the current flows through the light emitting element. That is, the output voltage V2 is determined based on the signal voltage V1 or the current I flowing through the light emitting element in the case of the signal voltage.

As described with FIG. 5, terminal-to-terminal voltage of the light emitting element when the voltage V2 is programmed in the holding capacitor so that current flows matches the precharge voltage V1 of the light emitting element. Accordingly, the charge of the coupling capacitor of the light emitting element does not vary before and after programming the voltage V2. That is, it is not necessary to charge or discharge the coupling capacitor of the light emitting element during the programming period.

Thus, since the time for charging the coupling capacitor after the voltage is switched to the output voltage V2 becomes unnecessary, predetermined current immediately flows in the light emitting element so as to carry out programming with fast leading.

The value of the precharge voltage V1 of the light emitting element does not have to accurately match the terminal-to-terminal voltage of the light emitting element at the time when current flows in the light emitting element during the programming period or the light emitting period. A voltage being close to the terminal-to-terminal voltage at the time when current flows in the light emitting element preferably undergoes precharge so that charging or discharging the coupling capacitor is finalized in a short time while the programming voltage V2 is being applied.

As illustrated in FIG. 5, with respect to the current-voltage property, the terminal-to-terminal voltage of the light emitting element is different from the terminal-to-terminal voltage of the holding capacitor by the gate-source voltage of the transistor T2. For the current-voltage properties, the memory, for example, may have the table data and may refer to the target voltage of the light emitting element and the target voltage of the holding capacitor for the current flowing in the light emitting element with a mechanism not illustrated in the drawing so as to control the voltage being output by the first and second voltage supplies.

The first and second voltage supplies 109 and 110 are units for outputting two voltages and may include two power supply circuits, While two voltages may be arranged to be switched and output from one power supply circuit.

Exemplary Embodiment with Current Programming Method

So far, the voltage programming has been assumed for description. As for a current programming method for connecting the signal line to the current source to program a current signal in the holding capacitor, an embodiment to which the present invention is applied will be described below.

In current programming, a pixel circuit illustrated in FIG. 7 is used.

The pixel circuit in FIG. 7 includes a first switch (the switching circuit 2401 in FIG. 2) including two transistors T1 and T2 and a current mirror circuit (the drive circuit 2402 in FIG. 2) including a holding capacitor 301, a reference transistor T3 and a drive transistor T4.

The reference transistor T3 and the drive transistor T4 include control terminals (gate), which are both connected to a terminal of the holding capacitor, and one main electrode (source) of the transistors, which are both connected to an organic EL element 201. The other electrode terminal (drain) of the reference transistor T3 is connected to the signal line through the switching elements T1 and T2. The other main electrode terminal (drain) of the drive transistor T4 is connected to the Vdd power supply.

In the signal line 103, a current supply terminal 108 to become a current supply unit together with the voltage supplies 109 and 110 being a first and second voltage supply units are arranged. The current supply terminal 108 is connected to the signal line in parallel to the first and second voltage supplies 109 and 110. In the current programming method, the signal current is input to the pixel circuit so that a voltage corresponding to the value of the signal current is retained in the holding capacitor. The current supplied by the current supply terminal 108 will become a signal. A constant current source 501 included in the current supply terminal 108 outputs a constant current for one signal. However, since the current signal is variable according to brightness, the constant current source 501 is a current source which can vary output current according to a signal.

Figure 6:
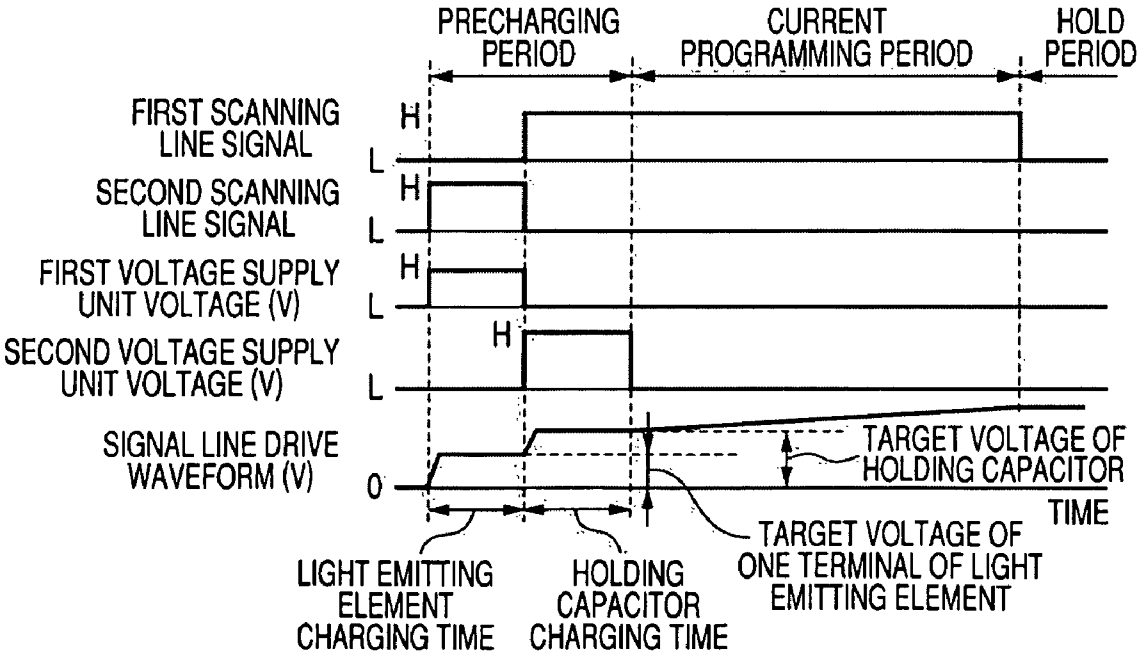
FIG. 6 is a timing chart illustrating an operation of the display apparatus of the present invention.

FIG. 6 is a timing chart on current programming operations.

In FIG. 6, a precharging period is provided before the current programming period. The precharging period consists of light emitting element charging time and holding capacitor charging time.

The voltage V1 applied to the pixel circuit from the first voltage supply 109 through the signal line 103 during the light emitting element charging time is set so as to be equal to the terminal-to-terminal voltage of the light emitting element when the signal current flows in the light emitting element during the subsequent current programming period. The voltage does not necessarily have to match the voltage but is set closer to the voltage as much as possible.

The voltage V2 applied to the pixel circuit from the second voltage supply 110 through the signal line 103 during the holding capacitor charging time is set so as to be equal to the voltage charged in the holding capacitor during the immediately subsequent current programming period. The voltage does not necessarily have to match the voltage but is set closer to the voltage as much as possible.

Taking the signal current I, the voltages V1 and V2 determined by the signal current I establishes a relation illustrated in FIG. 5. Difference from the voltage programming method is that not only the voltage V1 but also the voltage V2 is determined based on the signal current I.

The respective steps of current programming will be described in order as follows.

At first, a first step will be carried out as follows during the light emitting element charging time in FIG. 6.

The signal of the first scanning line 104 will get Low. The signal of the second scanning line 105 will get High. A voltage is applied from the first voltage supply 109 to the signal line 103. Here, even if the signal of the first scanning line 104 is High, a similar effect can be obtained and, therefore, any of Low and High is applicable. The drive waveform of the signal line 103 will become a target voltage of the light emitting element. The target voltage is applied to the light emitting element 102 through the switching element 106 which has been activated. Accordingly, the coupling capacitor of the light emitting element 102 is charged to provide the target voltage.

Next, a second step will be carried out as follows during the holding capacitor charging time.

The signal of the first scanning line 104 will get High. The signal of the second scanning line 105 will get Low. A voltage is applied from the second voltage supply 110 to the signal line 103. The drive waveform of the signal line 103 will become a target voltage of the holding capacitor. The target voltage is applied to the holding capacitor inside the drive circuit 2402 through the switching circuit 2401 in FIG. 2. Accordingly, the holding capacitor is charged to provide the target voltage of the holding capacitor. Voltages to be output by the first and second voltage supplies are mutually different. Thereby, the coupling capacitor and the holding capacitor of the light emitting element can be charged in a short time also at the time of low gradation.

So far, the current programming is the same as the voltage programming that has already been described.

Subsequently a third step will be carried out as follows during the current programming period illustrated in FIG. 6.

Only the signal of the first scanning line 104 gets High to inactivate the switch which brings the first and second voltage supplies and the signal line 103 into simultaneous connection. The current is supplied to the signal line 103 only from the current supply terminal 108. The current flows into the light emitting element 102 through the switching circuit 2401 and the drive circuit 2402. The current being output by the current supply terminal 108 is data current required for the light emitting element 102 to emit light with desired gradation. During the current programming period, the holding capacitor voltage charged in the second target voltage is adjusted to an accurate value for compensating the property variation of the organic EL element and the transistor.

During the holding period after the current programming period is finalized, the signal of the first scanning line gets Low. Current does not flow in the switching circuit 2401 and the holding capacitor voltage is held, and thereby, predetermined current continues to flow in the light emitting element 102 from the power supply voltage Vdd through the drive circuit 2402. By repeating the cycle, gradation is displayed.

EXAMPLES

First Embodiment

A first embodiment in the present invention will be described in detail.

FIG. 7 illustrates a configuration of a drive circuit of a display apparatus related to the first embodiment of the present invention.

A pixel 107 is configured by a pixel circuit 101, an organic EL element 201 being a light emitting element and a switching element 106. A current supply unit 108 comprising a constant current source 501, a first voltage supply 109 and a second voltage supply 110 are respectively connected to a signal line 103.

Figure 3:
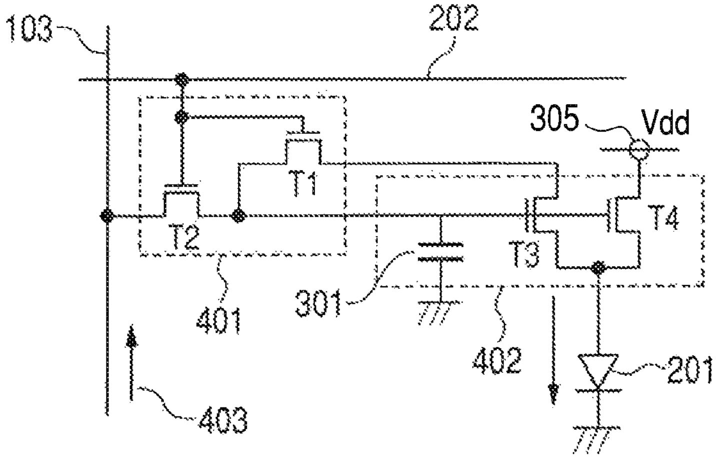
FIG. 3 (PRIOR ART)
FIG. 3 illustrates a pixel circuit of a current programming method.

A pixel 107 of the present embodiment charges the coupling capacitor of the organic EL element 201 in the pixel circuit of a current programming method in FIG. 3 and is provided with a transistor T5 for setting one terminal to predetermined voltage. Moreover, a second scanning line 105 for scanning the transistor T5 is provided.

Here, the transistors T1 to T5 are n-type thin film transistors. The first voltage supply 109 is configured by a variable voltage source V1 and a switch for switching the voltage output in accordance with a first pulse. The voltage of the variable voltage source V1 is a first target voltage for charging the coupling capacitor of the organic EL element 201 and is controlled with reference to table data of current-voltage property on current flowing in an organic EL element illustrated in FIG. 5 and voltage of one terminal of the organic EL element.

In addition, the second voltage supply 110 is configured by a variable voltage source V2 and a switch switching the voltage output with a second pulse. The voltage of the variable voltage source V2 is a second target voltage for charging the holding capacitor 301, and is controlled with reference to table data of current-voltage property on current flowing in at least one thin film transistor and an organic EL element illustrated in FIG. 5 and holding capacitor voltage.

Figure 8:
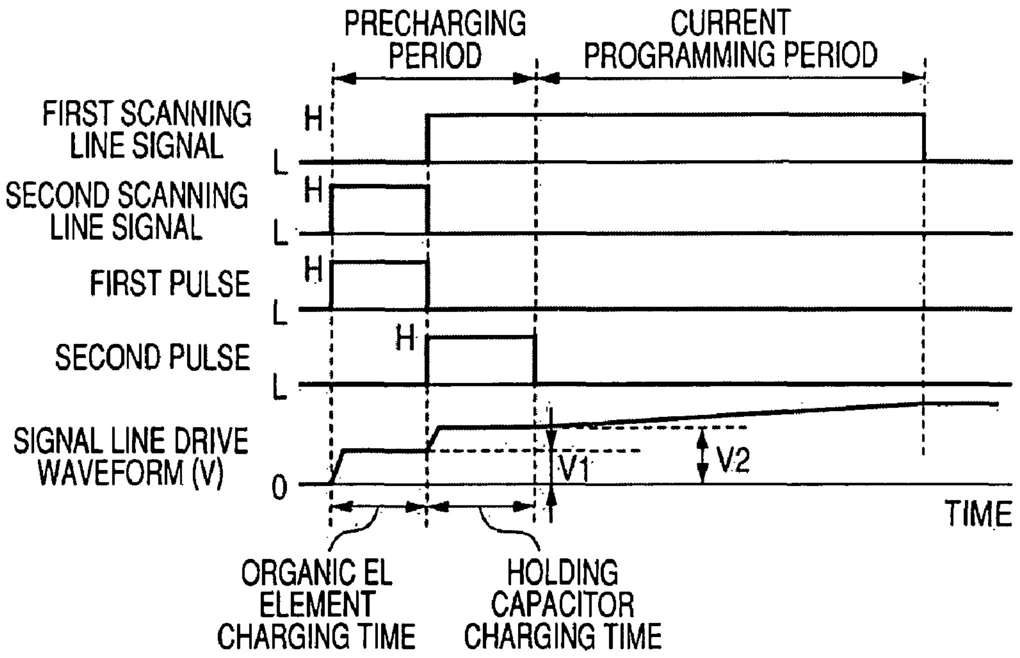
FIG. 8 is a timing chart of embodiments 1 and 3 of the present invention.

Next, a programming operation of the first embodiment of the present invention in the drive circuit in FIG. 7 will be described in detail with FIG. 8. FIG. 8 is a timing chart of the first embodiment of the present invention. The timing chart generally includes a precharging period and a current programming period. The precharging period includes organic EL element charging time and holding capacitor charging time. The coupling capacitor of the organic EL element 201 and the holding capacitor 301 are respectively charged during each period to attain predetermined voltage.

At first, during the organic EL element charging time, the signal of the second scanning line 105 and the first pulse will get High. Accordingly, the transistors T1 and T2 in FIG. 7 will be inactivated and the transistor T5 will be activated.

Figure 9:
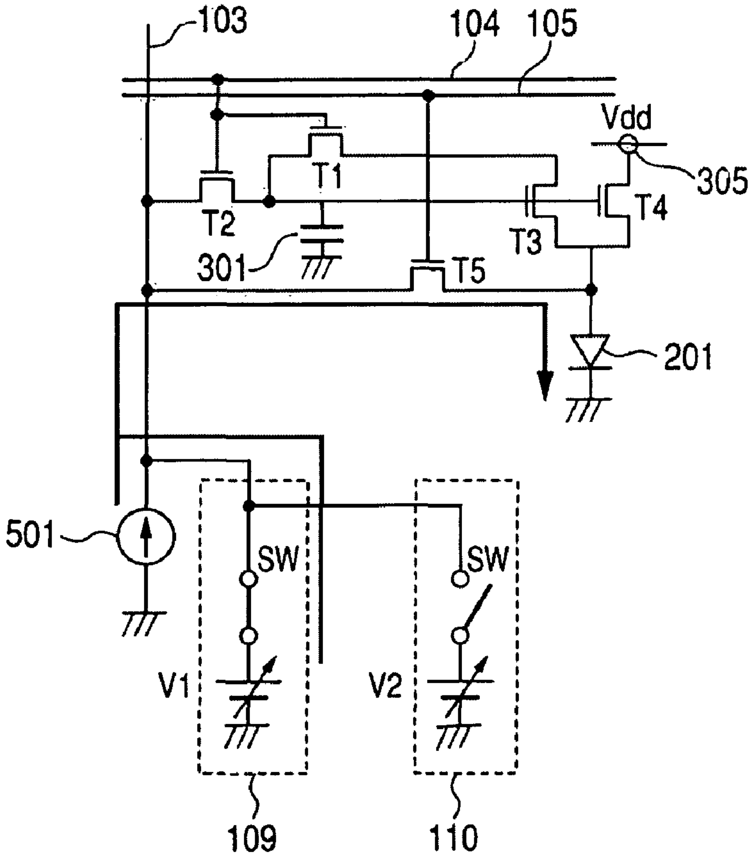
FIG. 9 is a diagram for describing a light emitting element charging time of the embodiment 1.

At that time, current is supplied to the organic EL element 201 from the constant current source 501 and the first voltage supply 109 connected to the signal line 103 through the transistor T5. This appearance is illustrated in FIG. 9. That is, current supplied to the organic EL element 201 will be current flowing through the transistor T5. Here, the gate voltage of the transistor T5 is sufficiently large. Therefore, the current supplied to the organic EL element 201 from the transistor T5 is large. Accordingly, the coupling capacitor of the organic EL element 201 is charged in short time to attain the first target voltage (voltage V1).

Figure 10:
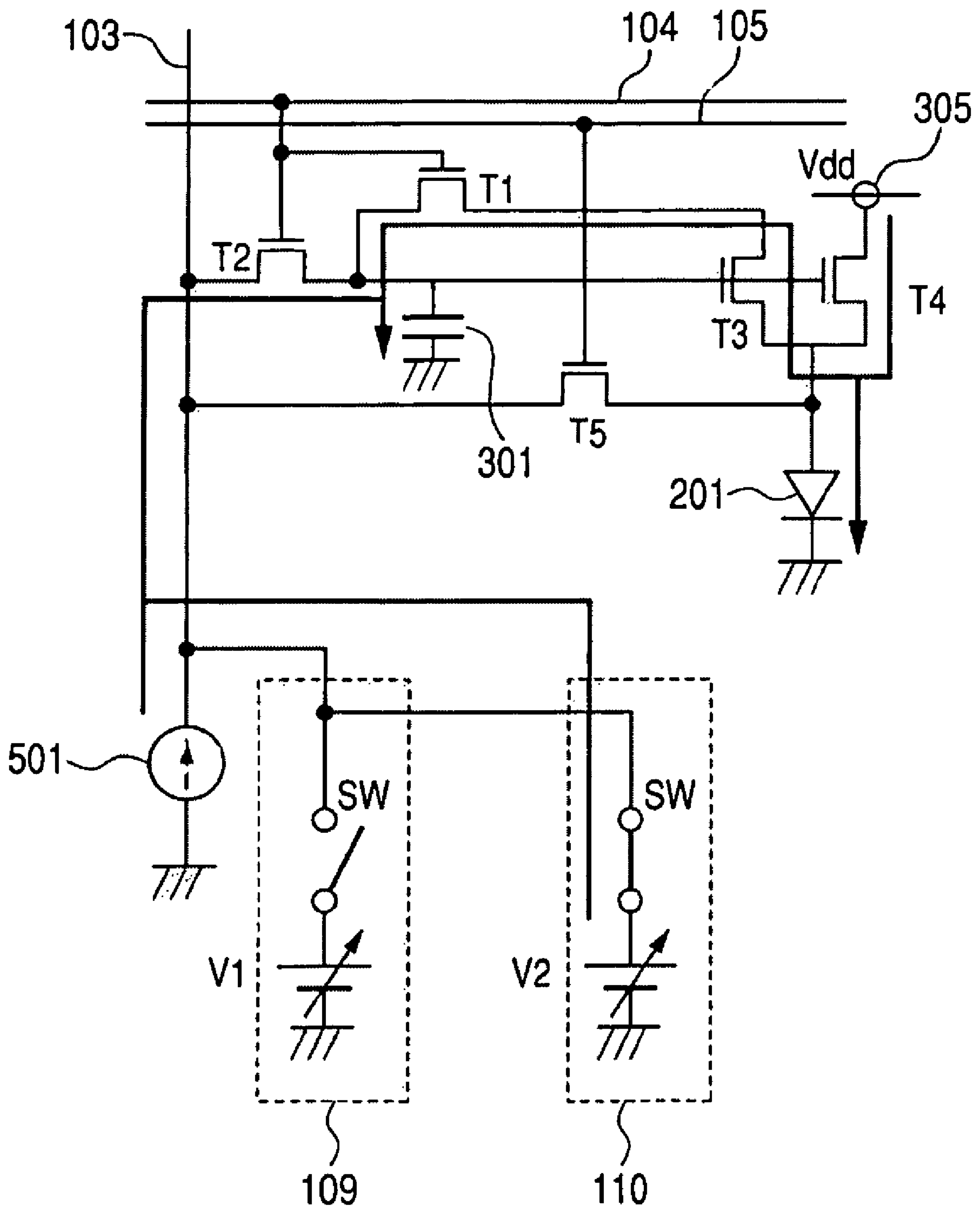
FIG. 10 is a diagram for describing holding capacitor charging time of the embodiments 1 and 2.

Next, in the holding capacitor charging time, the signal of the first scanning line 104 and the second pulse will get High. The signal of the second scanning line 105 and the first pulse will get Low. Accordingly, the transistors T1 and T2 in FIG. 7 will be activated and the transistor T5 will be inactivated. At that time, current is supplied from the constant current source 501 and the second voltage supply 110 connected to the signal line 103 to the holding capacitor 301 through the transistor T2 so that charging is carried out to attain the second target voltage (voltage V2). This appearance is illustrated in FIG. 10.

The operation during the above described organic EL element charging time and the holding capacitor charging time causes the drive waveform voltage of the signal line during the precharging period to shift to the voltages V1 and V2 as illustrated in FIG. 8. A reason is that the target voltages of the coupling capacitor and the holding capacitor of the organic EL element differ by the gate-source voltage of the transistor T3.

Here, in the above described description, the voltage V2 is described to be higher than the voltage V1. However, occasionally the voltages V1 and V2 happen to be equal or the voltage V1 happens to be higher than the voltage V2. For example, in the case where a reverse bias is applied between the gate and source of a TFT and in the case where the voltage Vth of the TFT is 0 V or on the negative side, the voltages V1 and V2 will become equal or the voltage V1 will reach a voltage higher than the voltage V2.

Figure 11:
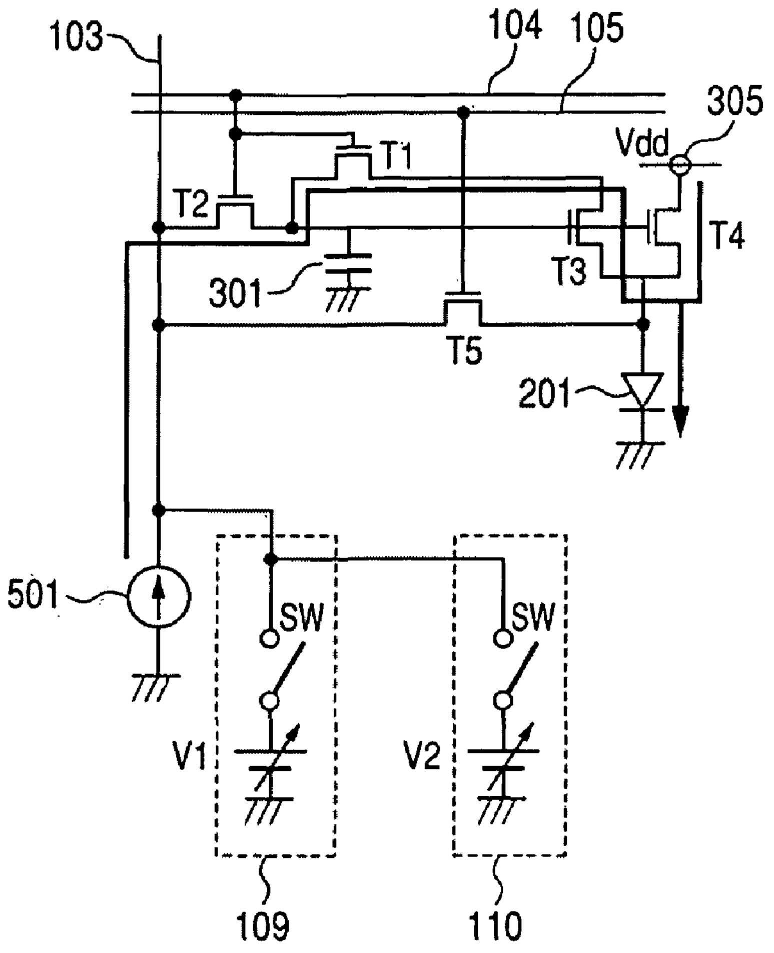
FIG. 11 is a diagram for describing current programming of the embodiments 1 and 2.

Lastly, during the current programming period, the second pulse will get Low and only the signal of the first scanning line 104 will get High. The transistors T1 and T2 in FIG. 7 are activated and the transistor T5 is inactivated. The first and second voltage supplies 109 and 110 and the signal line 103 are disconnected so that the signal line 103 is supplied with current only from the constant current source 501. The appearance is illustrated in FIG. 11. The current being output by the constant current source 501 is data current required for the organic EL element 201 to emit light with desired gradation. Accordingly, an accurate programming operation of compensating the property variation of the transistor and the organic EL element is carried out during this period.

The present inventor has driven the drive circuit in FIG. 7 with the timing chart in FIG. 8 by SPICE simulation and has confirmed the effect. At first, calculation conditions on the SPICE simulation will be described.

Wiring capacitance of the signal line 103 is 12.6 pF. Wiring resistance of the signal line 103 is 7.125 kΩ. Wiring capacitance of the first and second scanning lines 104 and 105 is 21 pF. Wiring resistance of the first and second scanning lines 104 and 105 is 11.875 kΩ. Wiring capacitance of the wiring of the power supply voltage Vdd 305 is 37.8 pF. Wiring resistance of the wiring of the power supply voltage Vdd 305 is 427.5Ω. The holding capacitor 301 is 1 pF. The coupling capacitance of the organic EL element 201 is 12.3 pF. The parasitic capacitance of the n-type thin film transistors T1 to T4 is 1.73 fF. In addition, the gate length of the thin film transistors T1 to T5 is all 5 μm. The gate width for the transistors T1 and T2 is 25 μm. The gate width for the transistor T3 is 40 μm. The gate width for the transistor T4 is 240 μm. The gate width for the transistor T5 is 25 μm. Here, the gate insulation layer thickness is 200 nm and mobility is 7.5 $cm^2/Vs$.

In the above described conditions, an operation during the precharging period of 20 μsec is simulated with the voltage of the variable voltage source V1 being 6.3 V, the voltage of the variable voltage source V2 being 6.6 V and the data current value of the constant current source 501 being 100 nA, Here, the organic EL element charging time is 2 μsec and the holding capacitor charging time is 18 μsec.

Figure 12:
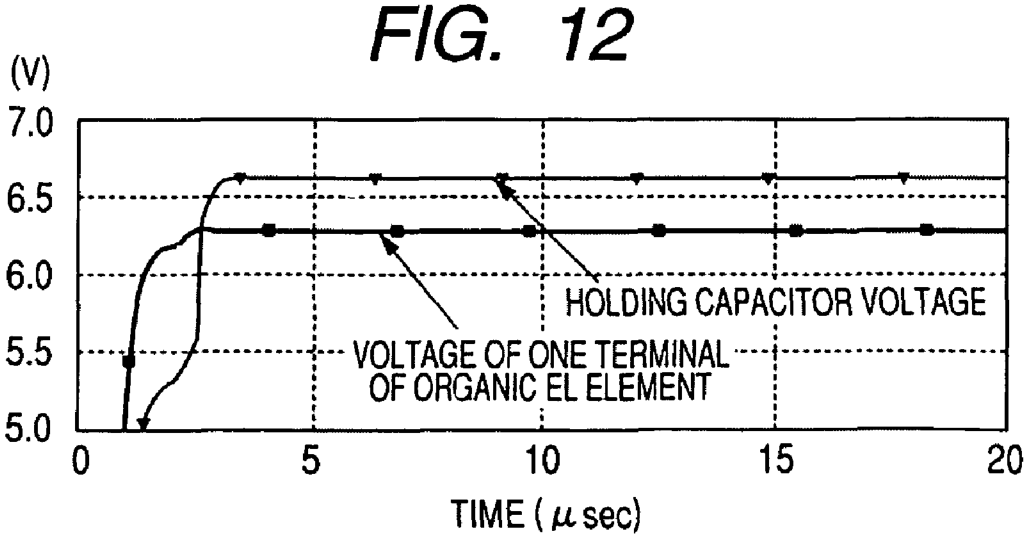
FIG. 12 is a diagram illustrating time variation of a light emitting element voltage and a holding capacitor voltage of a display apparatus of the present invention.

The simulation result under the above described calculation conditions is illustrated in FIG. 12. FIG. 12 specifies time variation of the voltage of one terminal of the organic EL element and the holding capacitor voltage during the precharging period.

As illustrated in FIG. 12, the holding capacitor voltage and the voltage of one terminal of the organic EL element are apparently both converged to a fixed value within 5 μsec. The conventional precharge requires time of 10 μsec or longer. However, in the present embodiment, the precharging period can be shortened to 5 μsec. For example, in the case where a full HD (1920×1080 pixels) panel is operated at 120 frames per second, the programming period for one line is 7.7 μsec and, therefore, the improvement effect of the 5 μsec is significant. Accordingly, it has been confirmed that a display apparatus capable of rapid programming also at the time of low gradation could be provided by adopting a configuration of the present embodiment.

Comparative Embodiment

The present inventor has applied the driving method with the above described conventional precharge to the drive circuit in FIG. 3 and has confirmed the effect by SPICE simulation.

At first, calculation conditions on the SPICE simulation will be described. Wiring capacitance of the signal line 103 is 12.6 pF. Wiring resistance of the signal line 103 is 7.125 kΩ. Wiring capacitance of the scanning line 202 is 21 pF. Wiring resistance of the scanning line 202 is 11.875 kΩ. Wiring capacitance of the wiring for supplying the power supply voltage Vdd is 37.8 pF. Wiring resistance of the wiring for supplying the power supply voltage Vdd is 427.5Ω. The holding capacitor 301 is 1 pF. The coupling capacitance of the organic EL element 201 is 12.3 pF. The parasitic capacitance of the transistors T1 to T4 is 1.73 fF. The gate width of the transistors T1 to T4 is all 5 μm. The gate width for the transistors T1 and T2 is 25 μm. The gate width for the transistor T3 is 40 μm. The gate width for the transistor T4 is 240 μm. Here, the gate insulation layer thickness of the transistors T1 to T4 is 200 nm and mobility is 7.5 $cm^2/Vs$.

Figure 13:
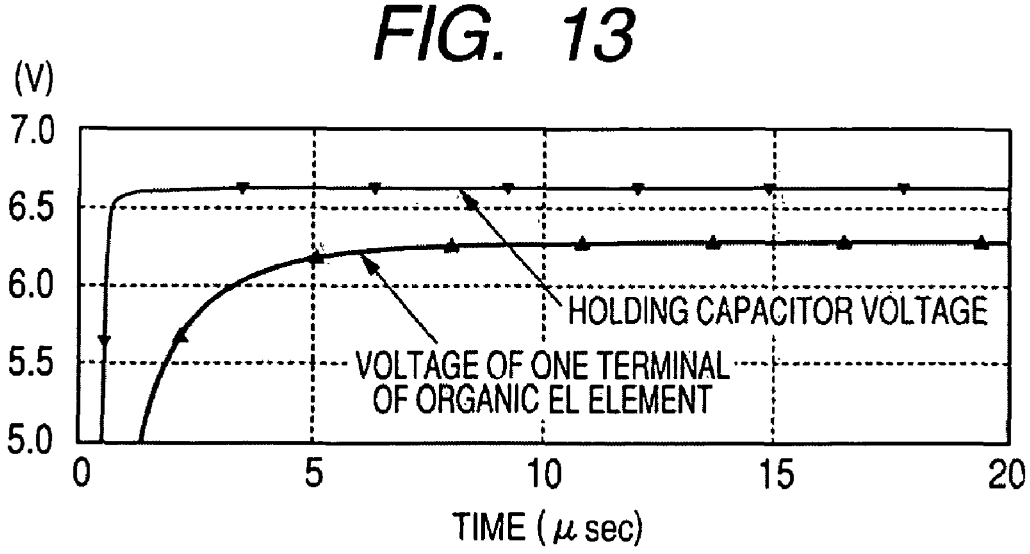
FIG. 13 is a diagram illustrating time variation of a light emitting element voltage and a holding capacitor voltage of a conventional display apparatus.

In the conditions, the programming operation during the precharging period of 20 μsec is simulated with the precharge voltage being 6.6 V and the data current value of the constant current source being 100 nA. FIG. 13 illustrates the simulation result to specify time variation of the voltage of one terminal of the organic EL element and the holding capacitor voltage during the precharging period. The precharge operation is carried out each time when predetermined data current is programmed on each pixel and, therefore, the precharging period on designing the drive circuit is required to be shortened as much as possible. However, from the simulation result, it has been turned out to take time for the voltage of one terminal of the organic EL element to be converged to a fixed value. On the other hand, the holding capacitor voltage is converged in short time. Considering time until the voltage of one terminal of the organic EL element gets converged, the precharging period cannot be made shorter than 10 μsec.

Second Embodiment

Next, a second embodiment in the present invention will be described.

A drive circuit of a display apparatus in the second embodiment is illustrated in FIG. 7, which is the same as the circuit for the first embodiment and, therefore, description on the circuit will be omitted.

Figure 14:
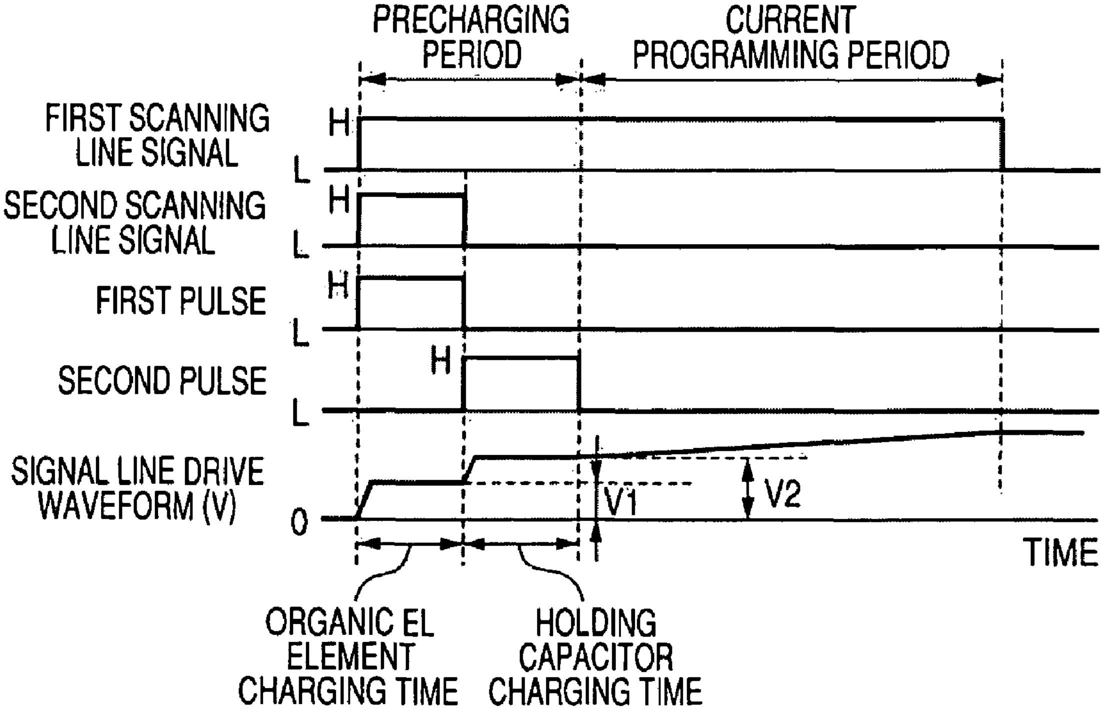
FIG. 14 is a timing chart of the embodiment 2 of the present invention.

A programming operation of the second embodiment will be described in detail with FIG. 14. FIG. 14 is a timing chart of the second embodiment of the present invention.

Apparently from comparing the timing chart in FIG. 14 with the timing chart in FIG. 8, the difference between the present embodiment and the first embodiment is that the signal of the first scanning line 104 is High during the organic EL element charging time.

Figure 15:
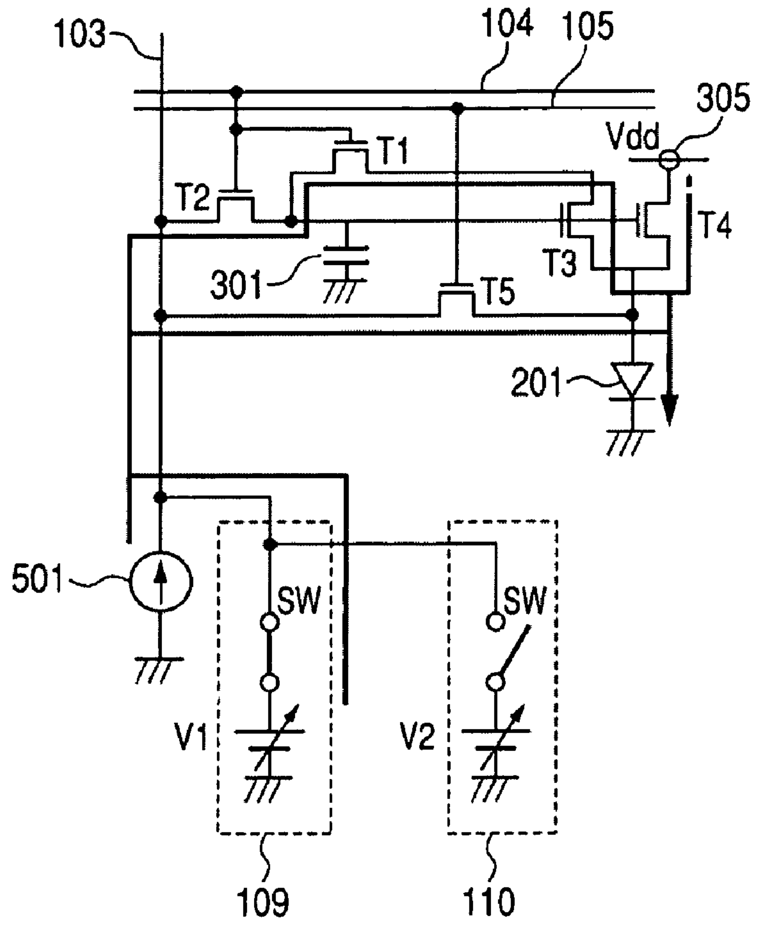
FIG. 15 is a diagram for describing light emitting element charging time of the embodiment 2.

During the organic EL element charging time, the signal of the first scanning line 104, the signal of the second scanning line 105 and the first pulse will get High. Accordingly, the transistors T1, T2 and T5 in FIG. 7 will be activated. On the other hand, current is supplied to the signal line 103 from the constant current source 501 and the first voltage supply 109. This appearance is illustrated in FIG. 15. That is, current supplied to the organic EL element 201 will be the sum of current flowing through the transistors T3, T4 and T5. Here, the gate voltages of the transistors T3 and T4 are low at the time of low gradation. Therefore, the current supplied to the organic EL element 201 from the transistors T3 and T4 is small. In contrast, since the gate voltage of the transistor T5 is sufficiently large, the current supplied from the transistor T5 to the organic EL element 201 is large. Accordingly, the coupling capacitor of the organic EL element is charged in short time to attain the first target voltage (voltage V1).

Next, in the holding capacitor charging time, the signal of the first scanning line 104 maintains to be High; the second pulse will get High; and the signal of the second scanning line 105 and the first pulse will get Low. Accordingly, the transistors T1 and T2 in FIG. 7 will be activated and the transistor T5 will be inactivated. At that time, current is supplied from the constant current source 501 and the second voltage supply 110 connected to the signal line 103 to the holding capacitor 301 through the transistor T2 so that charging is carried out to attain the second target voltage (voltage V2). This appearance is illustrated in FIG. 10.

The operation during the above described organic EL element charging time and the holding capacitor charging time causes the drive waveform voltage of the signal line 103 during the precharging period to shift to the voltages V1 and V2 as illustrated in FIG. 14. A reason is that the target voltages of the coupling capacitor of the organic EL element and the holding capacitor 301 differ by the gate-source voltage of the transistor T3.

The operation during the current programming period to be carried out lastly is the same as the operation in the already described first embodiment.

The present inventor has driven the drive circuit in FIG. 7 with the timing chart in FIG. 14 by SPICE simulation and has confirmed the effect. Calculation conditions on the SPICE simulation is the same as the calculation conditions for the first embodiment.

Figure 16:
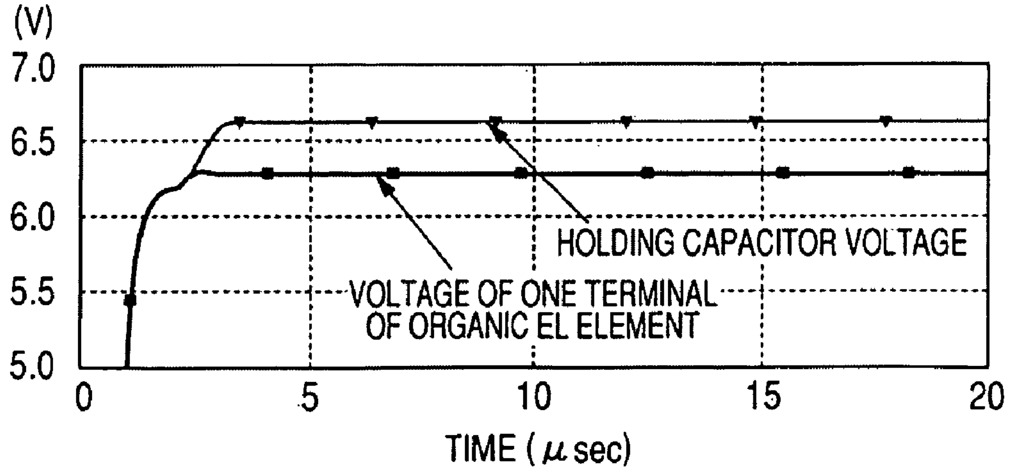
FIG. 16 is a diagram illustrating time variation of a light emitting element voltage and a holding capacitor voltage of a display apparatus of the present invention.

The simulation result under the same calculation conditions as in the first embodiment is illustrated in FIG. 16. FIG. 16 specifies time variation of the voltage of one terminal of the organic EL element and the holding capacitor voltage during the precharging period.

As illustrated in FIG. 16, the holding capacitor voltage and the voltage of one terminal of the organic EL element are apparently both converged to a fixed value within 5 μsec as the simulation result of the embodiment 1 illustrated in FIG. 12. As illustrated in FIG. 13, the conventional precharge requires time of 10 μsec or longer. However, for the configuration in the present embodiment, the precharging period can be shortened to 5 μsec. Accordingly, it has been confirmed that a display apparatus capable of rapid programming also at the time of low gradation could be provided by adopting a configuration of the present embodiment.

Third Embodiment

A third embodiment in the present invention will be described.

Figure 17:
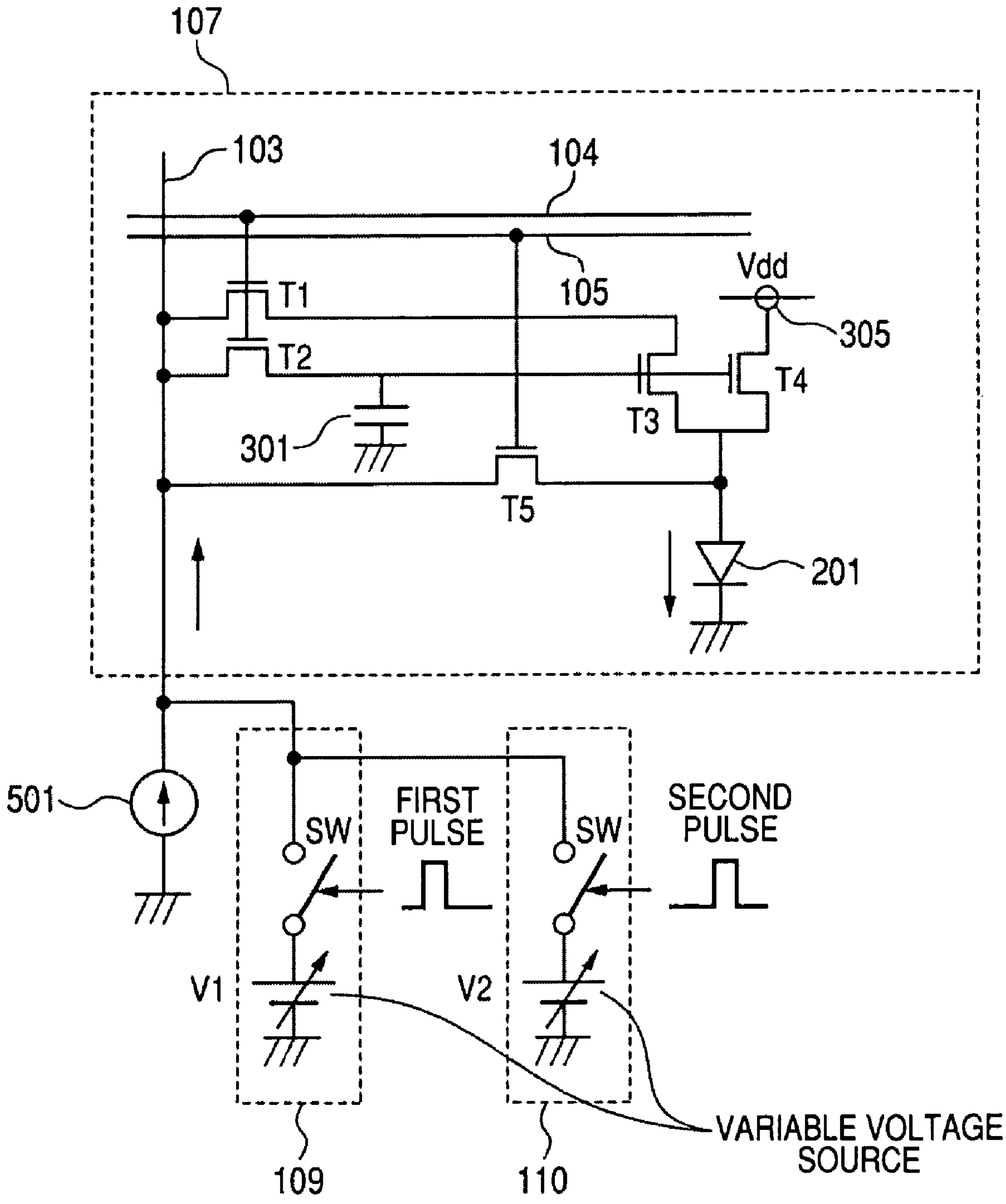
FIG. 17 illustrates a pixel circuit of an embodiment 3 of the present invention.

FIG. 17 illustrates a configuration of a drive circuit of a display apparatus for the third embodiment of the present invention.

Apparently from comparing the drive circuit in FIG. 17 with the drive circuit in FIG. 7, the difference between the present embodiment and the first embodiment is that the selective transistor T1 is directly connected to the signal line 103. Accordingly, current can flow in the current mirror circuit without through the transistor T2. Therefore, the load can be made small. The other configurations of the drive circuit are the same as the configuration of the drive circuit in FIG. 7 and, therefore, description on the drive circuit will be omitted.

Any timing chart in FIG. 8 and FIG. 14 is applicable to the programming operation in the drive circuit in FIG. 17. Here, the operation is carried out by a driving method of the timing chart in FIG. 8. The programming operation is the same as the operation of the first embodiment and, therefore, description on the operation will be omitted.

Figure 18:
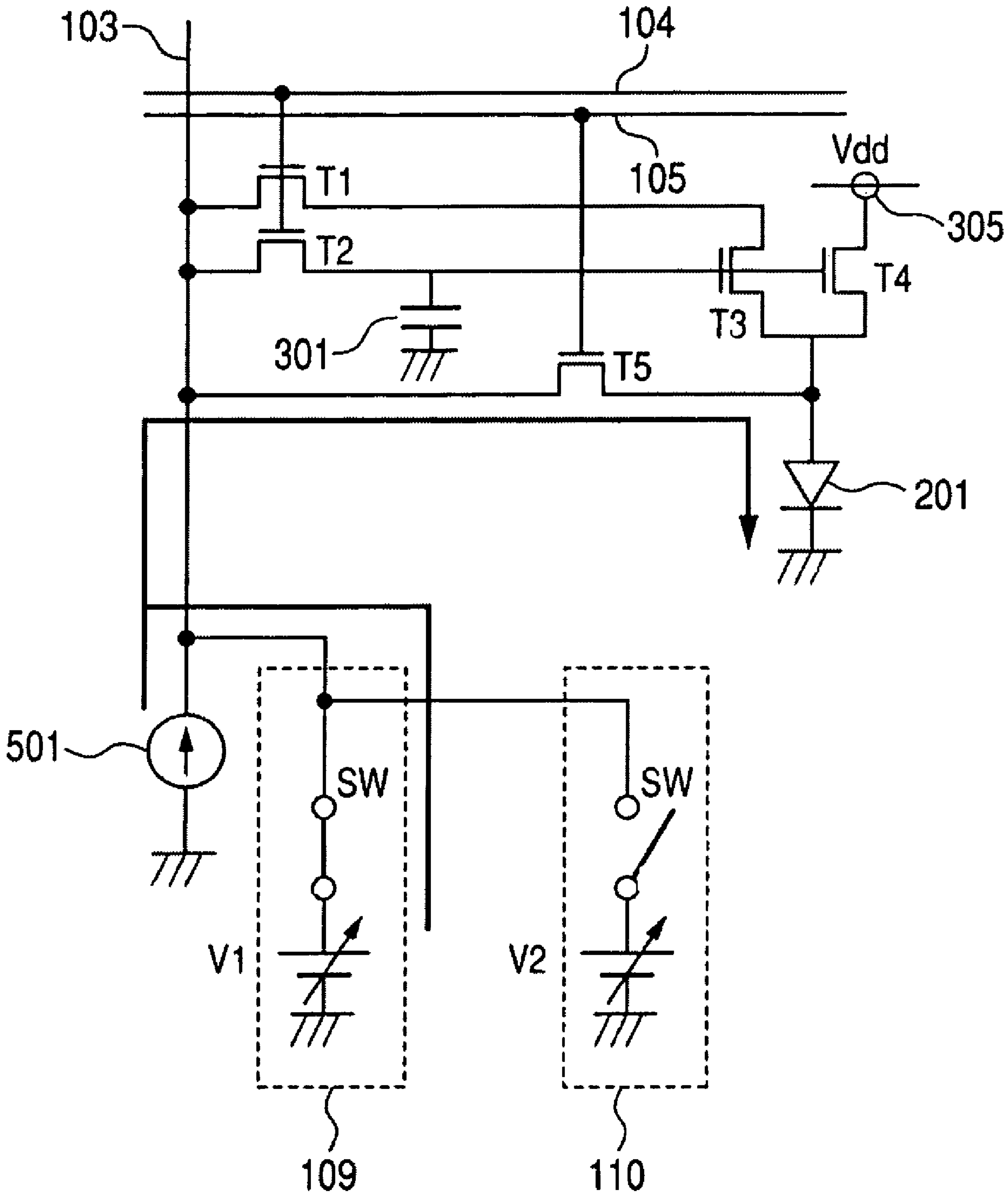
FIG. 18 is a diagram for describing a light emitting element charging time of the embodiment 3.
Figure 19:
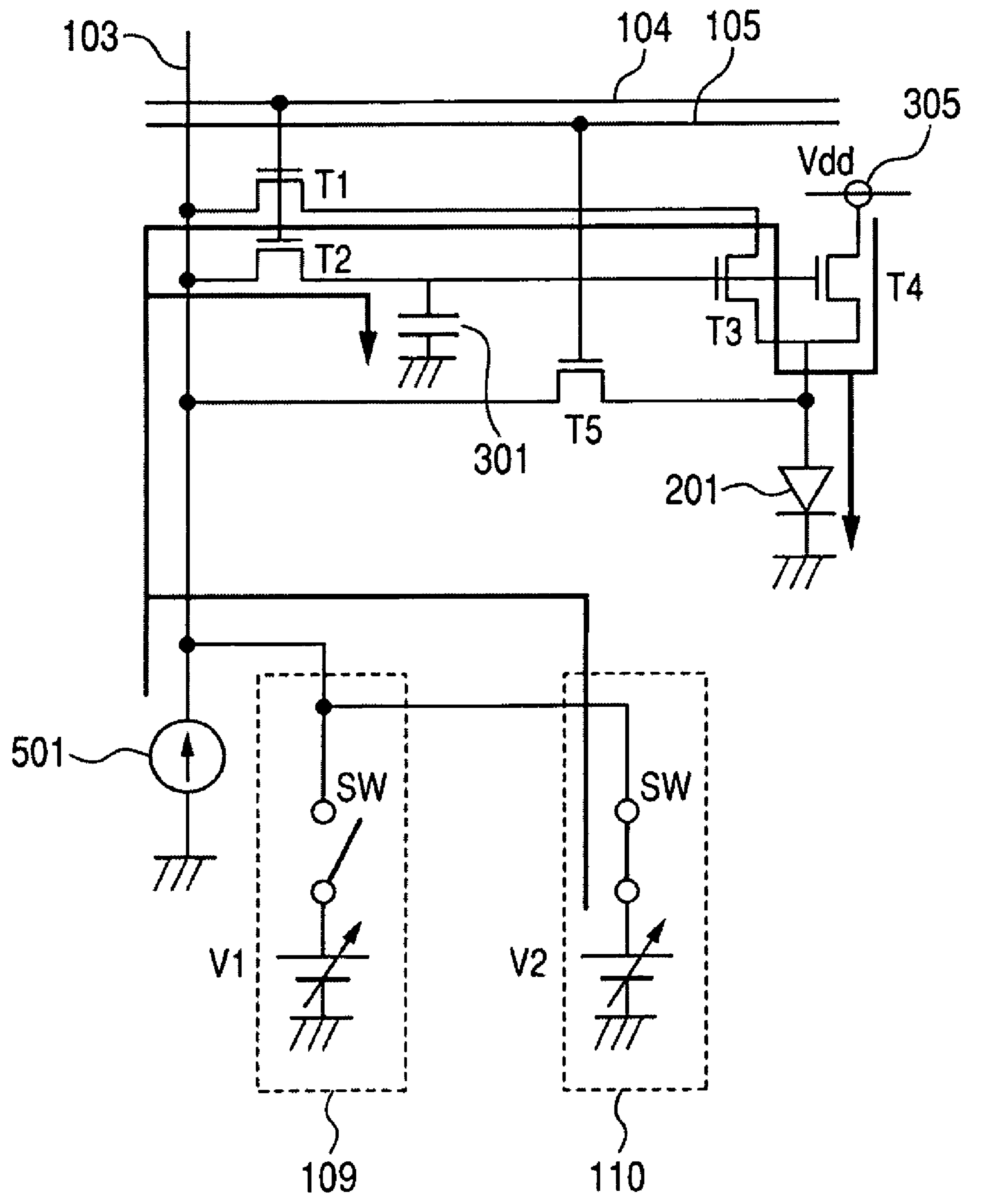
FIG. 19 is a diagram for describing holding capacitor charging time of the embodiment 3.
Figure 20:
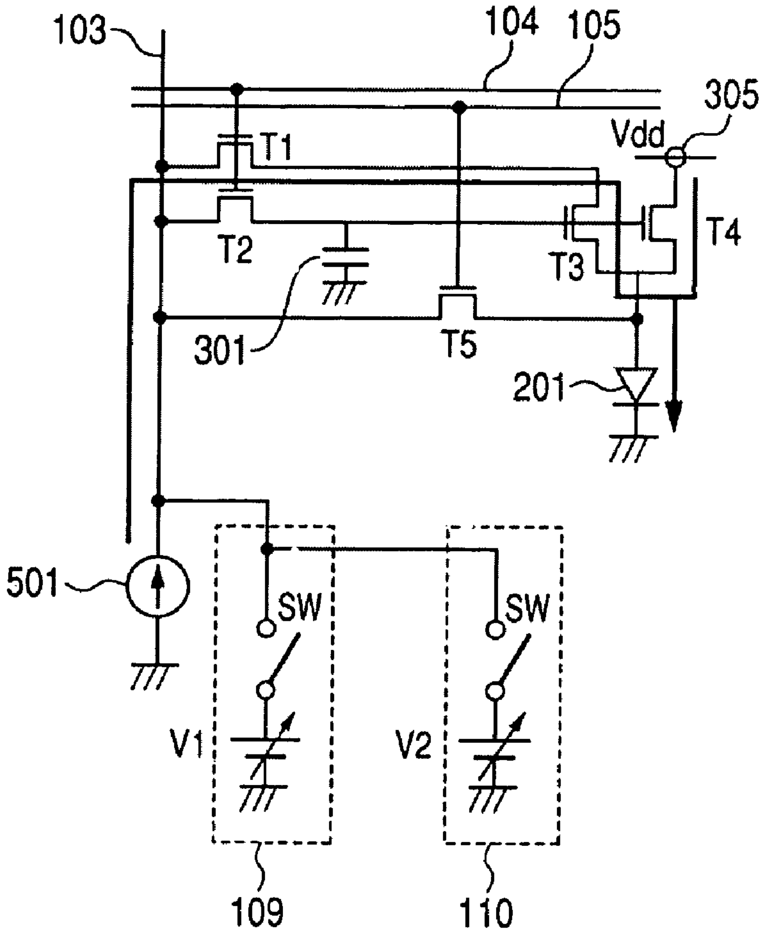
FIG. 20 is a diagram for describing current programming of the embodiment 3.

FIG. 18 corresponds with FIG. 9 and illustrates appearance of current being supplied from a constant current source 501 and the first voltage supply 109 connected to the signal line 103 to the organic EL element 201 through the transistor T5. FIG. 19 corresponds with FIG. 10 and illustrates appearance of current being supplied from the constant current source 501 and the second voltage supply 110, that are connected to the signal line 103, to the holding capacitor 301 through the transistor T2 and charging until reaching a second target voltage (V2 voltage). FIG. 20 illustrates appearance of current being supplied only from the constant current source 501 to the signal line 103.

The present inventors have driven the drive circuit in FIG. 17 with the timing chart in FIG. 8 by SPICE simulation and has confirmed the effect.

Calculation conditions on the SPICE simulation is the same as the first embodiment.

Figure 21:
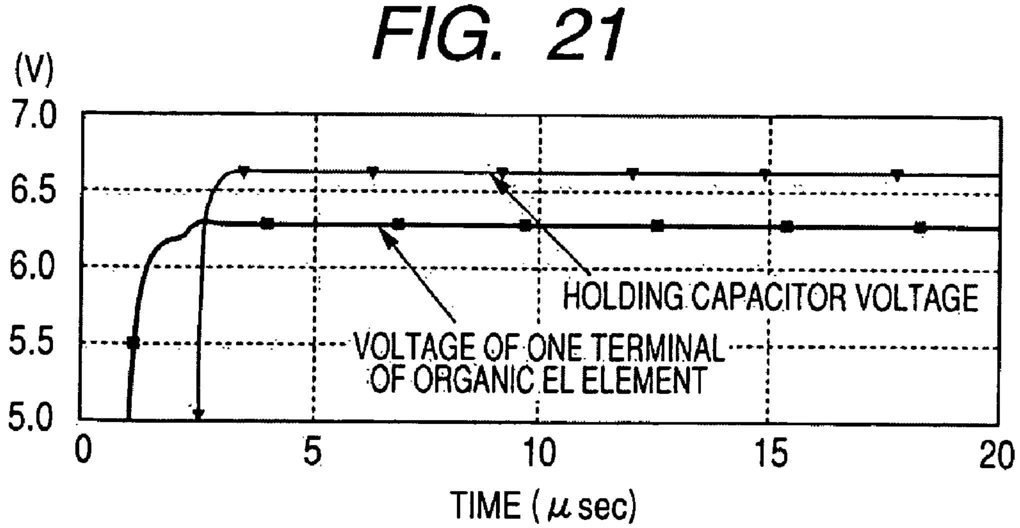
FIG. 21 is a diagram illustrating time variation of a light emitting element voltage and a holding capacitor voltage of a conventional display apparatus.

FIG. 21 illustrates a result of the simulation and illustrates time variation of the voltage of one terminal of organic EL element and the holding capacitor voltage during a precharging period. Likewise the simulation result of the embodiment 1, the holding capacitor voltage and the voltage of one terminal of the organic EL element are apparently both converged to a fixed value within 5 μsec. As illustrated in FIG. 13, the conventional precharge requires time of 10 μsec or longer. However, in the present embodiment, the precharging period can be shortened to 5 μsec. Accordingly, it was confirmed that a display apparatus capable of rapid programming also at the time of low gradation could be provided by applying a configuration of the present embodiment.

Fourth Embodiment

A fourth embodiment in the present invention will be described. The first to third embodiments describe current programming method for programming current signals but the present embodiment will describe voltage programming method for programming voltage signals.

FIG. 4 illustrates a drive circuit of a display apparatus in the fourth embodiment of the present invention.

The pixel 107 is configured by a pixel circuit comprising the transistors T1 and T2 and the holding capacitor, the transistor T3 and the organic EL element 201. Here, the pixel circuit in the present embodiment corresponds with the pixel circuit 101 in FIG. 1. The transistor T3 in the present embodiment corresponds with the switching element 106 in FIG. 1. The first voltage supply 109 and the second voltage supply 110 are respectively connected to the signal line 103. In addition, likewise FIG. 7, the pixel includes a transistor T3 for charging coupling capacitance of the organic EL element 201 and attaining a predetermined voltage for one terminal and a second scanning line 105 for scanning the transistor T3. Here, the transistors T1 to T3 are n-type thin film transistors. The first voltage supply 109 is configured by a variable voltage source V1 and a switch for switching the voltage output in accordance with a first pulse. The voltage of the variable voltage source V1 is a first target voltage for charging the coupling capacitor of the organic EL element 201 and is controlled with reference to table data of current-voltage property on current flowing in an organic EL element illustrated in FIG. 5 and voltage of one terminal of the organic EL element.

In addition, the second voltage supply 110 is configured by a variable voltage source V2 and a switch for switching the voltage output in accordance with a second pulse. The voltage of the variable voltage source V2 is a second target voltage for charging the holding capacitor 301, and is controlled with reference to table data of current-voltage property on current flowing in at least one thin film transistor and an organic EL element illustrated in FIG. 5 and holding capacitor voltage.

Figure 22:
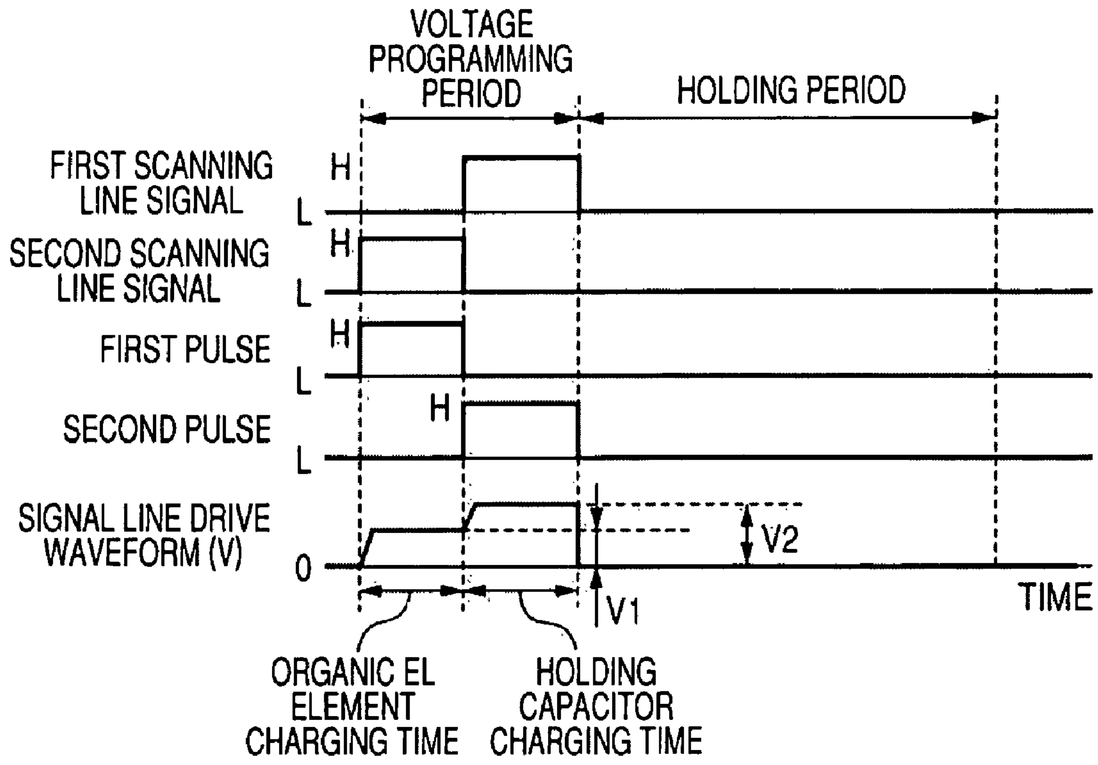
FIG. 22 is a timing chart of the embodiment 4 of the present invention.

A programming operation in the drive circuit in FIG. 4 will be described. Here, the present fourth embodiment is based on the voltage programming method. FIG. 22 is a timing chart of the fourth embodiment. The timing chart generally includes a voltage programming period and a holding period. In addition, the voltage programming period includes organic EL element charging time and holding capacitor charging time. The coupling capacitance of the organic EL element 201 and the holding capacitor 301 are respectively charged during each period to attain predetermined voltage.

At first, during the organic EL element charging time, the signal of the second scanning line 105 and the first pulse will get High. Accordingly, the transistor T1 in FIG. 4 will be inactivated and the transistor T3 will be activated. At that time, current is supplied to the organic EL element 201 from the first voltage supply 109 connected to the signal line 103 through the transistor T3. That is, current supplied to the organic EL element 201 will be current flowing through the transistor T3. Here, the gate voltage of the transistor T3 is sufficiently large. Therefore, the current supplied to the organic EL element 201 from the transistor T3 is large. Accordingly, the coupling capacitance of the organic EL element 201 is charged in short time to attain the first target voltage (voltage V1).

Next, in the holding capacitor charging time, the signal of the first scanning line 104 and the second pulse will get High. The signal of the second scanning line 105 and the first pulse will get Low. Accordingly, the transistor T1 in FIG. 4 will be activated and the transistor T3 will be inactivated. At that time, current is supplied from the second voltage supply 110 connected to the signal line 103 to the holding capacitor 301 through the transistor T1 so that charging is carried out to attain the second target voltage (voltage V2).

The operation during the above described organic EL element charging time and the holding capacitor charging time causes the drive waveform voltage of the signal line during the voltage programming period to shift to the voltages V1 and V2 as illustrated in FIG. 22. A reason is that the target voltages of the coupling capacitance of the organic EL element and the holding capacitor differ by the gate-source voltage of the transistor T2.

Lastly, during the holding period, the signal of the first scanning line 104 will get Low and the second pulse will get Low. The transistors T1 and T3 in FIG. 4 will be inactivated and the holding capacitor voltage being a data voltage is held and, thereby, predetermined current continues to flow in the organic EL element 201 from Vdd through the transistor T2.

The present inventors have driven the drive circuit in FIG. 22 with the timing chart in FIG. 4 by SPICE simulation and has confirmed the effect. At first, calculation conditions on the SPICE simulation will be described.

Wiring capacitance of the signal line 103 is 12.6 pF. Wiring resistance of the signal line 103 is 7.125 kΩ. Wiring capacitance of the first and second scanning lines is 21 pF. Wiring resistance of the first and second scanning lines is 11.875 kΩ. Wiring capacitance of the wiring of the power supply voltage Vdd 305 is 37.8 pF. Wiring resistance of the wiring of the power supply voltage Vdd 305 is 427.5Ω. The holding capacitor 301 is 1 pF. The coupling capacitance of the organic EL element 201 is 12.3 pF. The parasitic capacitance of the n-type thin film transistors T1 to T3 is 1.73 fF. In addition, the gate length of the thin film transistors T1 to T3 is all 5 μm. The gate width for the transistors T1 and T3 is 25 μm. The gate width for the transistor T2 is 240 μm. Here, the gate insulation layer thickness is 200 nm and mobility is 7.5 $cm^2/Vs$.

In the above described conditions, an operation during the voltage programming period of 20 μsec is simulated with the voltage of the variable voltage source V1 being 6.3 V, the voltage of the variable voltage source V2 being 6.6 V and the data current value of the constant current source 501 being 100 nA, Here, the organic EL element charging time is 2 μsec and the holding capacitor charging time is 18 μsec.

Figure 23:
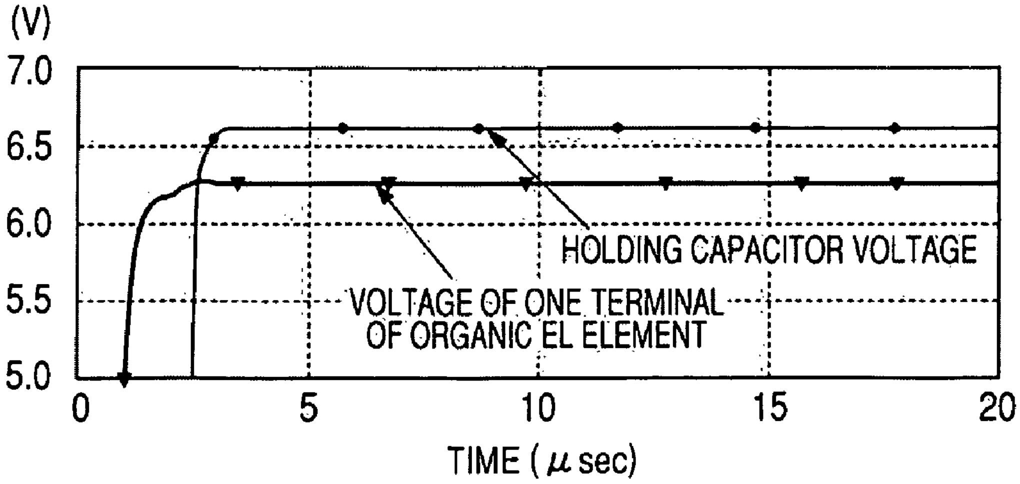
FIG. 23 is a diagram illustrating time variation of a light emitting element voltage and a holding capacitor voltage of the embodiment 4 of the present invention.
Figure 24:
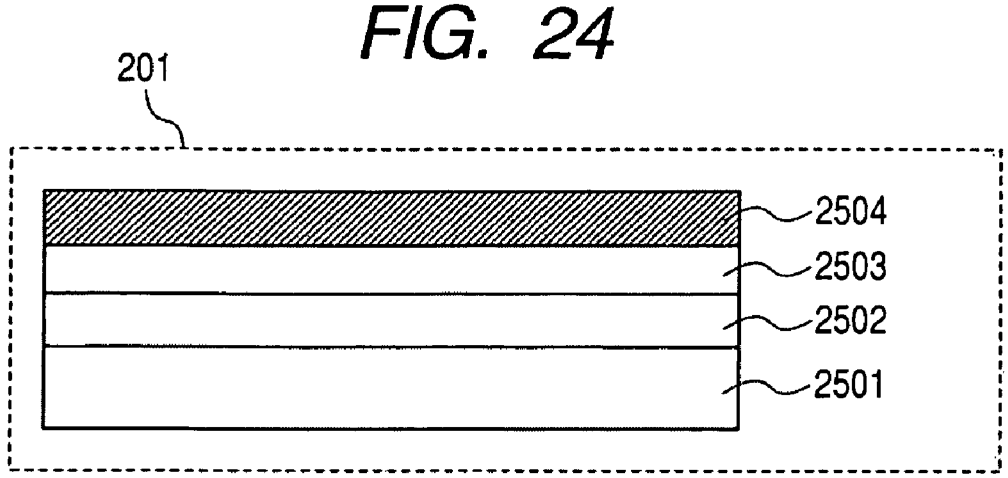
FIG. 24 is a sectional view of an organic EL element.
Figure 25:
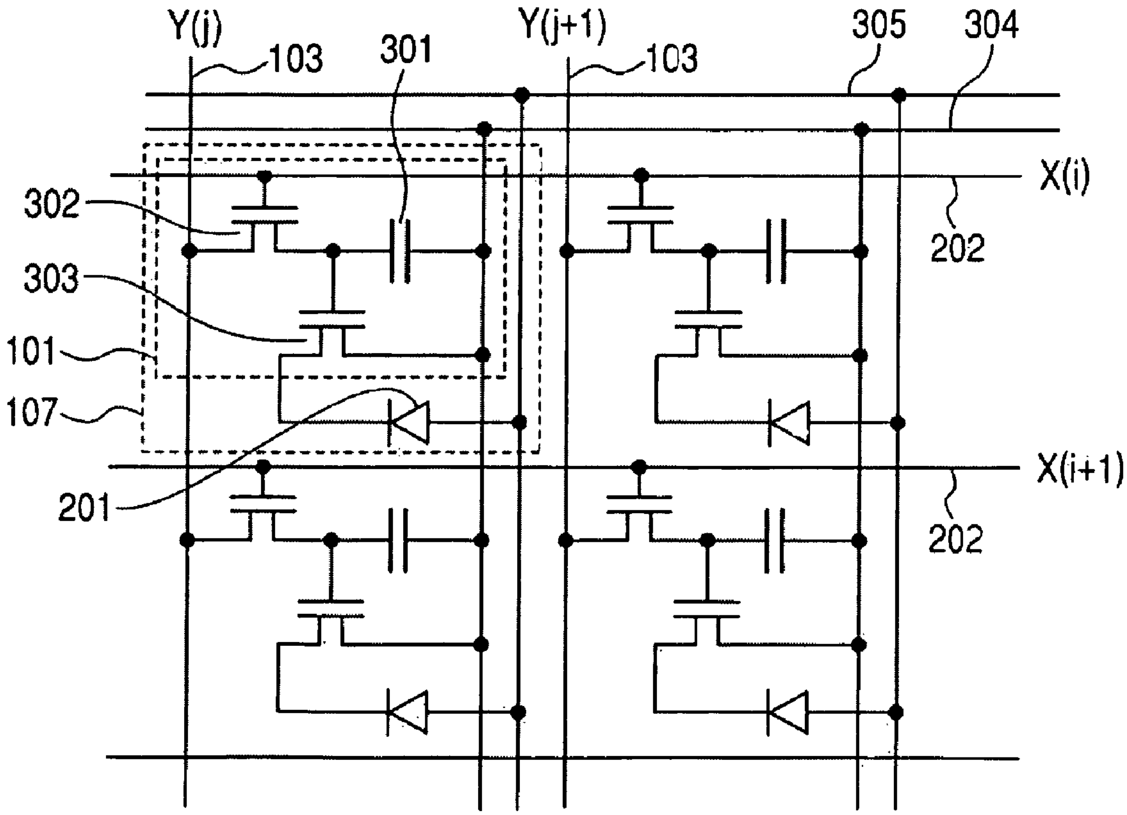
FIG. 25 illustrates a drive circuit of a conventional display apparatus.
Figure 26:
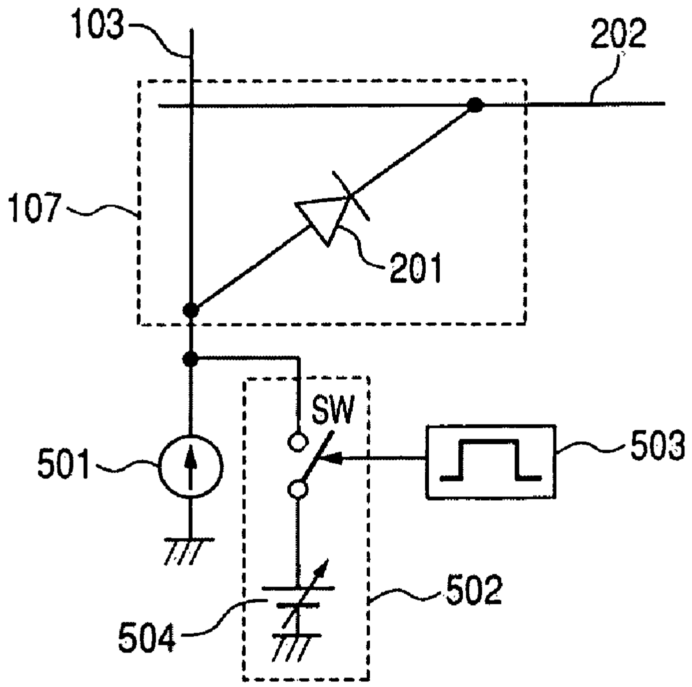
FIG. 26 illustrates a conventional pixel circuit and a conventional precharge circuit.
Figure 27:
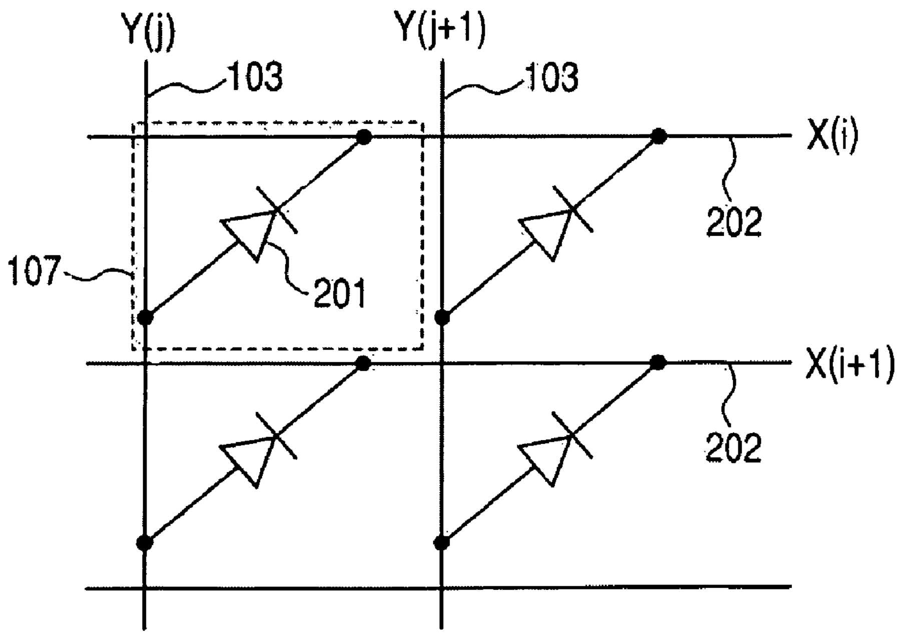
FIG. 27 is a diagram for describing a drive circuit of a conventional passive matrix display panel.
Figure 28:
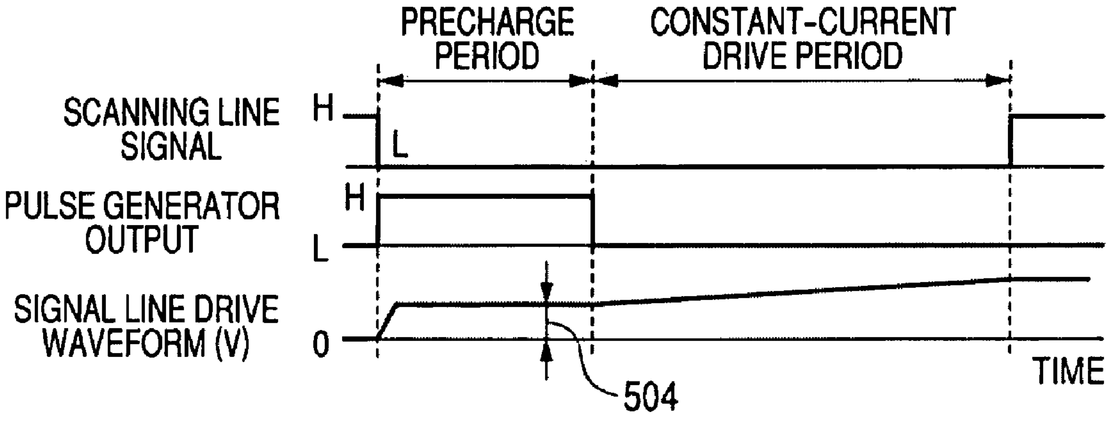
FIG. 28 is a timing chart of a conventional precharge and a conventional current programming operation.

The simulation result under the above described calculation conditions is illustrated in FIG. 23. FIG. 23 specifies time variation of the voltage of one terminal of the organic EL element and the holding capacitor voltage during the precharging period. The holding capacitor voltage and the voltage of one terminal of the organic EL element are apparently both converged to a fixed value within 5 μsec. Accordingly, it was confirmed that the effect of the present invention is obtainable also in the display apparatus of a voltage programming method by applying the present embodiment.

The present invention is suitably used for each embodiment having been described above in the case where semiconductor mainly including amorphous silicon is used as an active layer of a thin film transistor and in the case where semiconductor mainly including one of metal oxide and compound oxide including a plurality of oxides is used as an active layer. As an example, material mainly including metal oxide, is selected from the group consisting of tin oxide, zirconium oxide, indium oxide and compound oxide including a plurality of those oxides. An impurity can be doped in those materials.

In the case of using amorphous silicon TFT and amorphous oxide semiconductor TFT which are smaller than low-temperature polysilicon TFT in mobility and inferior to low-temperature polysilicon TFT in drive force (an application for a large-screen display and the like is forced to fulfill such requirement), it is difficult to use a TFT in a saturated region. The reason is that sufficient saturation property is originally not obtainable with the above described material and that increase in drive voltage (operation during the saturated region) increases electricity consumption too much. Therefore, in the case of using amorphous silicon TFT and amorphous oxide semiconductor TFT which are inferior in drive force, it is necessary to adopt a driving method which can compensate property variation of a TFT and an organic EL element in the region where the TFT is not saturated sufficiently.

The present invention is effective also in the case of using a transistor which is lower than one of single crystal and polycrystalline silicon TFT in mobility and is inferior to one of single crystal and polycrystalline silicon TFT in drive force as in the case of thin film transistor made of an active layer mainly including amorphous silicon and amorphous metal oxide.

Because even in the case where saturation property of a transistor is not sufficient but a property drift of a light emitting element takes place, an excellent compensating function is obtainable according to the present invention.

In addition, as a light emitting element, an organic EL element mainly including an organic material is used. However, an inorganic EL element mainly including inorganic material can be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-172458, filed on Jun. 29, 2007, which is hereby incorporated by reference herein in its entirety.

What is claimed is:

1. A display apparatus comprising:

a scanning line;

a signal line; and a pixel circuit arranged in a site where the scanning line crosses the signal line, which controls a light emitting element and current to be supplied to the light emitting element, wherein the pixel circuit is selected according to a signal applied to the scanning line, and a signal is input to the selected pixel circuit from the signal line, and the pixel circuit includes:

a drive transistor connected to a terminal of the light emitting element;

a holding capacitor, having a terminal connected to a gate of the drive transistor;

a first switch which opens and closes connection between the terminal of the light emitting element and the signal line in accordance with a signal applied to the scanning line; and a second switch which opens and closes connection between the terminal of the holding capacitor and the signal line in accordance with a signal applied to the scanning line, and wherein first and a second voltage supplies are switchably connected to the signal line, and during a period when the pixel circuit is selected, the first voltage supply is connected to the signal line and the first switch is closed so that a voltage of the first voltage supply is applied to the terminal of the light emitting element, and the second voltage supply is connected to the signal line and the second switch is closed and the first switch is opened, so that a voltage of the second voltage supply is applied to the terminal of the holding capacitor, wherein the voltage of the second voltage supply is a signal voltage for determining the current to be supplied to the light emitting element, the voltage of the first voltage supply is determined based on a terminal-to-terminal voltage of the light emitting element when the voltage of the second voltage supply is applied to the holding capacitor and current flows in the light emitting element, and supply of the voltage of the second voltage supply is performed after supply of the voltage of the first voltage supply.

2. The display apparatus according to claim 1, wherein the scanning line comprises two scanning lines for applying signals to the first switch and the second switch, respectively.

3. The display apparatus according to claim 1, wherein the pixel circuit includes a transistor which supplies the light emitting element with current corresponding with a voltage of the holding capacitor.

4. The display apparatus according to claim 1, further comprising a current supply terminal connected to the signal line, and the current supply terminal supplies the light emitting element with current through the second switch when the first and the second voltage supplies are disconnected from the signal line.

5. The display apparatus according to claim 4, wherein voltages of the first and second voltage supplies are determined based on a terminal-to-terminal voltage of the light emitting element when a voltage of the current supply terminal is input to the pixel circuit and current flows in the light emitting element.

6. The display apparatus according to claim 1, wherein the pixel circuit comprises a current mirror circuit including two transistors with control terminals both being connected to one terminal of the holding capacitor, and one main electrode terminal of each of the transistors being connected to one terminal of the light emitting element, and wherein the second switch connects the signal line to one terminal of the holding capacitor and the signal line to the other main electrode terminal of one of the two transistors.

7. The display apparatus according to claim 1, wherein the pixel circuit includes a thin film transistor, and the thin film transistor is made of a semiconductor mainly including amorphous silicon.

8. A driving method of a display apparatus comprising a scanning line, a signal line, and a pixel circuit arranged in a site where the scanning line crosses the signal line, which controls a light emitting element and a current to be supplied to the light emitting element, wherein the pixel circuit includes:

a drive transistor connected to a terminal of the light emitting element, a holding capacitor, having a terminal connected to a gate of the drive transistor, a first switch which opens and closes connection between the terminal of the light emitting element and the signal line in accordance with a signal applied to the scanning line, a second switch which opens and closes connection between the terminal of the holding capacitor and the signal line in accordance with a signal applied to the scanning line, and wherein first and a second voltage supplies are switchably connected to the signal line, the driving method comprising the steps of, in this order:

applying a signal to the scanning line to close the first switch, connecting the first voltage supply to the signal line and applying a voltage of the first voltage supply to the terminal of the light emitting element;

applying a signal to the scanning line to close the second switch, connecting the second voltage supply to the signal line and applying a voltage of the second voltage supply to one terminal of the holding capacitor; and determining the voltage of the first voltage supply based on a terminal-to-terminal voltage of the light emitting element when the voltage of the second voltage supply is applied to the holding capacitor and current flows in the light emitting element, wherein the voltage of the second voltage supply is a voltage for determining a current to be supplied to the light emitting element.

9. The driving method of the display apparatus according to claim 8, wherein a current supply source is connected to the signal line of the display apparatus, and further comprising the steps of applying a signal to the scanning line to close the second switch and disconnecting the first and the second voltage supplies from the signal line and connecting the current supply terminal to the signal line to cause current to flow from the current supply terminal to the light emitting element.

* * * * *